(12) United States Patent
Ramanathan et al.

(10) Patent No.: US 10,301,727 B2
(45) Date of Patent: May 28, 2019

(54) COVALENT ORGANIC FRAMEWORKS AS POROUS SUPPORTS FOR NON-NOBLE METAL BASED WATER SPLITTING ELECTROCATALYSTS

(71) Applicant: Indian Educational and Research Institute, Pune (IN)

(72) Inventors: Vaidhyanathan Ramanathan, Chennai (IN); Dinesh Mullangi, Pune (IN); Shyamapada Nandi, Pune (IN)

(73) Assignee: INDIAN INSTITUTE OF SCIENCE EDUCATION AND RESEARCH, Pune, Maharashtra (IN)

( * ) Notice: Subject to any disclaimer, the term of this patent is extended or adjusted under 35 U.S.C. 154(b) by 186 days.

(21) Appl. No.: 15/348,670

(22) Filed: Nov. 10, 2016

(65) Prior Publication Data
US 2017/0130349 A1    May 11, 2017

(30) Foreign Application Priority Data

Nov. 10, 2015  (IN) .................... 4301/MUM/2015

(51) Int. Cl.
*C25B 11/04* (2006.01)
*C25B 11/06* (2006.01)
(Continued)

(52) U.S. Cl.
CPC ...... *C25B 11/0489* (2013.01); *C01B 13/0207* (2013.01); *C25B 1/04* (2013.01);
(Continued)

(58) Field of Classification Search
None
See application file for complete search history.

(56) References Cited

U.S. PATENT DOCUMENTS

2013/0295362 A1* 11/2013 Kanatzidis ............ B01J 20/262
428/219

2015/0068917 A1    3/2015 Schlogl et al.
2015/0275379 A1   10/2015 Nakamura et al.

FOREIGN PATENT DOCUMENTS

EP            2 832 767 A1       2/2015

OTHER PUBLICATIONS

Ni, et al., "Edge Overgrowth of Spiral Bimetallic Hydroxides Ultrathin-Nanosheets for Water Oxidation", Chem. Sci. 2015, 6, 3572-3576.
(Continued)

*Primary Examiner* — Brian W Cohen
(74) *Attorney, Agent, or Firm* — Kramer Amado, P.C.

(57) ABSTRACT

The present invention discloses porous covalent organic frameworks (COF) supported noble metal-free nanoparticles which are useful as electrocatalysts for a water splitting system, and to the process for preparation of such electrocatalysts. The covalent organic frameworks (COF) supported noble metal-free nanoparticles have general formula (I):

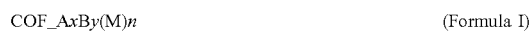

COF_A$x$B$y$(M)$n$        (Formula I)

wherein COF is selected from a Tris (4-formylphenyl) amine terephthaldehyde polymer or a benzimidazole-phloroglucinol polymer;

'A' and 'B' each independently represent a transition metal selected from the group consisting of Ni, Co, Fe, Mn, Zn, and mixtures thereof; or 'A' and 'B' together represent a transition metal selected from the group consisting of Ni, Co, Fe, Mn, Zn, and mixtures thereof;

'M' represents hydroxide or a nitride ion;

'x' and 'y' represent the weight % of the metal loadings; or a ratio of x:y is between 0:1 and 1:0; and 'n' is an integer 1 or 2 or 3.

20 Claims, 18 Drawing Sheets

(51) Int. Cl.
*C25B 1/04* (2006.01)
*C01B 13/02* (2006.01)
*C25B 11/03* (2006.01)

(52) U.S. Cl.
CPC ........ *C25B 11/035* (2013.01); *C25B 11/0405* (2013.01); *C25B 11/0415* (2013.01); *Y02E 60/366* (2013.01)

(56) References Cited

OTHER PUBLICATIONS

Ni, et al., "Edge Overgrowth of Spiral Bimetallic Hydroxides Ultrathin-Nanosheets for Water Oxidation", Electronic Supplementary Material (ESI) for Chemical Science, 14 pages.
Shalom, et al., "Nickel Nitride as an Efficient Electrocatalyst for Water Splitting", Electronic Supplementary Material (ESI) for Journal of Materials Chemistry A, 2015, 13 pages.
Shalom, et al., "Nickel Nitride as an Efficient Electrocatalyst for Water Splitting", J. Mater. Chem. A, 2015, e, 8171-8177.
Smith, et al., "Photochemical Route for Accessing Amorphous Metal Oxide Materials for Water Oxidation Catalysis", Science, Apr. 5, 2013, vol. 340, pp. 60-63.
Smith, et al., "Photochemical Route for Accessing Amorphous Metal Oxide Materials for Water Oxidation Catalysis", www.sciencemag.org/cgi/content/full/science.1233638/DC1, Mar. 28, 2013, 16 pages.
Trasatti, et al., "Ruthenium dioxide: a new interesting electrode material. Solid state structure and electrochemical behaviour", J. Electroanal. Chem., 29 (1971) App. 1-5.

* cited by examiner

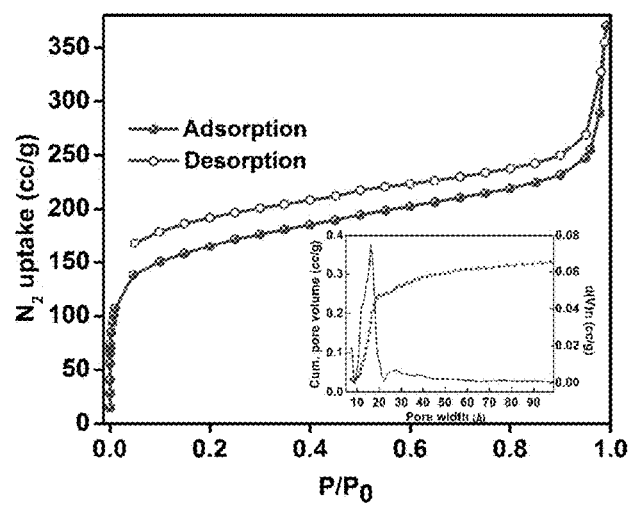
Fig 2
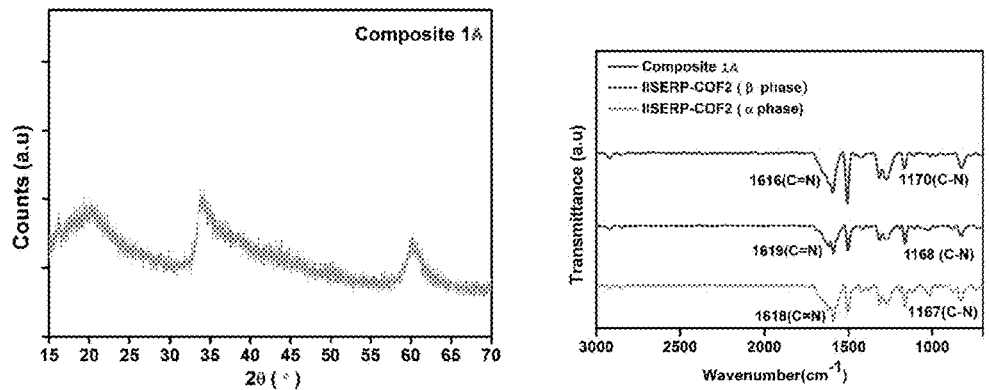
Fig 3A
Fig 3B

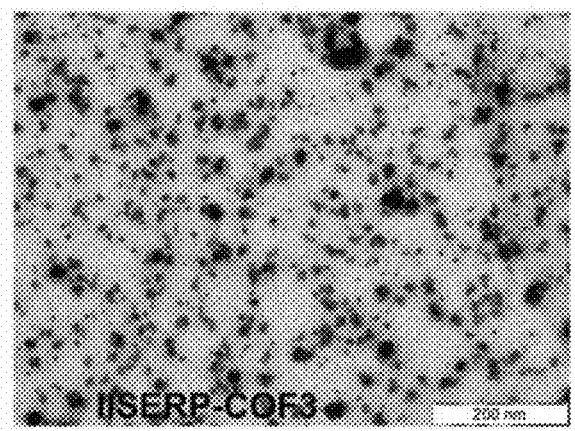
Fig 6D
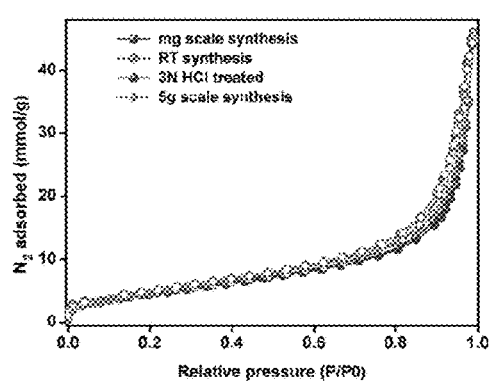 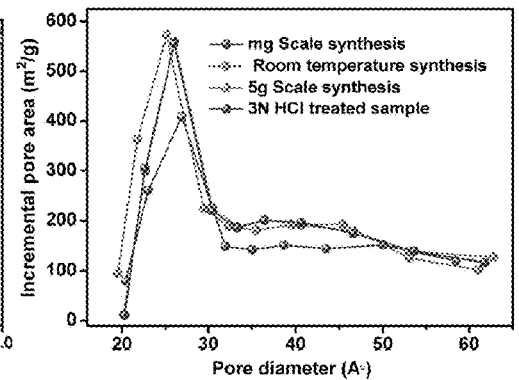
Fig 6E Fig 6F

COVALENT ORGANIC FRAMEWORKS AS POROUS SUPPORTS FOR NON-NOBLE METAL BASED WATER SPLITTING ELECTROCATALYSTS

BACKGROUND

1. Field

This disclosure relates generally to porous covalent organic frameworks (COF) supported noble metal-free nanoparticles of general formula (I) as electro catalyst for water splitting system and to the process for preparation thereof.

2. Description of Related Art

Water is the most important and abundantly available chemical resource for producing oxygen and hydrogen by electrocatalytic reduction; $2H_2O(l) \rightarrow O_2(g)+4H^*(aq)+4e-$. Electro catalysts with overpotential less than 300 mV at a current density of 10 $mA/cm^2$ have been benchmarked as promising electro catalysts. Noble metal based nanoparticle systems such as use of $RuO_2$ and $IrO_2$ are known to perform as superior electro catalysts in a reaction for artificially acquiring electrons from water such as in oxygen generation reactions (OER). The noble metal catalysts, however, find limited application on a large scale due to high cost of the precious metal.

Some water splitting catalysts comprise:

at least one 3d-block transition metal element selected from manganese, iron, cobalt, nickel, and copper or a compound containing the 3d-block transition metal element; and a base and/or a carbonate having a pKa of 8 or less.

The catalyst is preferably beta manganese dioxide and the base is selected from nitrogen-containing heterocyclic compounds or collidine. To achieve optimum catalytic activity, it is essential to perform the water oxidation reaction within a neutral range since Mn(III) formed as an intermediate during oxidation of water is found to reduce the catalytic activity.

As an alternative to the noble metal based electro catalyst systems, the binary or ternary oxides or hydroxides of metals such as Ni, Co, Fe or Mn were developed as promising catalysts. Fe—Co—Ni metal oxide film systems exhibit an overpotential of ~200 mV. However, these noble metal-free electro catalysts need further improvement in terms of their kinetics and their overpotential towards oxygen evolution reaction (OER).

Minimizing the amount of metal concentration in the working catalyst by suspending in organic supports manifests directly the Turnover numbers and frequencies, which translate to cheaper costs. Hence, improvements were made in the art by dispersing metal nanoparticles, other than the noble metals, randomly on to conducting carbon rich supports such as graphene or carbon nanotubes (CNT). Redox active nanoparticles suspended on a conducting support (graphene, CNT) have been found to be effective systems for electro catalytic water splitting. The use of such composite catalysts help in reducing the activation energy associated with the anodic oxygen evolution reaction, $2H_2O(l) \rightarrow O_2(g)+4H^*(aq)+4e-$ which is quantified in terms of overpotential ($\eta$), the excess potential required over the thermodynamic limit of oxygen evolution from water i.e. of 1.23V.

The electrolytic splitting of water may be performed using a carbon-supported manganese oxide (MnOx) composite under neutral electrolyte conditions. The carbon nanotubes used as a carbon support are functionalized using oxidation reagents selected from nitric acid, sulphuric acid, potassium chlorate, persulfate or hydrogen peroxide to homogeneously disperse the nanoparticles on to the support. The composite is characterized by a 190 mV lower overpotential measured at 2 $mA\ cm^{-2}$ when comprised in an OER-electrode for the electrolytic splitting of water under neutral electrolyte conditions. The MnOx composite is preferably a carbon-nanostructured material, e.g., a carbon-nanofiber and/or a carbon-nanotube (CNT), in to which is dispersed and deposited manganese oxide nanoparticles. The catalytic activity as well as stability is found to vary with the electronic differences such as oxidation states of manganese, Mn—O bonding and bond distances, crystallinity or variations in surface area and dispersion on the support or in support interactions between the MnOx materials.

A need still exists in the art to provide a porous, polymeric material which is stable, rigid, has exceptional thermal stabilities and can offer organic backbone or support for the incorporation of nanoparticles that can potentially tune the metal-support interactions to achieve maximum catalytic activity in water splitting reactions.

Covalent organic frameworks (COFs) due to their ordered structure, porosity and high surface area serve as crystalline organic supports and find use in several applications. The organic backbone can be manipulated to introduce specific functional groups and thereby specific chemical characteristics.

Some COFs comprise a plurality of amine subunits selected from the group consisting of diamines, triamines, and tetraamines; and a plurality of aldehyde subunits selected from the group consisting of dialdehydes, trialdehydes, and tetraaldehydes, where each di-, tri-, or tetraamine subunit is bonded with at least one aldehyde subunit by an imine bond. The iminic nitrogens are located at the cavities of the COFs and can be further functionalized with a metal atom selected from the group consisting of Mn, Fe, Co, Ni, Ru, Pt, Pd, Rh, Ir, Au, Nd, Eu and mixtures thereof, which confers to the material added chemical, electronic, magnetic, optical and redox features. The COF's are used in devices such as solar cells, flexible displays, lighting devices, sensors, photoreceptors, batteries, capacitors, gas storage devices and gas separation devices.

Other useful catalysts include spiral ultrathin-nanosheets with overgrown edges (SUNOE) of NiFe, CoNi and CoFe bimetallic hydroxides. Such SUNOE catalysts show good performance for the oxygen evolution reaction (OER) in the electrolysis of water, and the lowest onset potential was 1.45 V (vs. RHE) (the lowest potential when the current density reached 10 $mA\ cm^{-2}$ was 1.51 V (vs. RHE)). Also, nickel nitride ($Ni_3N$) may be used on nickel (Ni) foams for electrocatalytic applications. The $Ni_3N$/Ni-foam exhibits extremely low overpotential (~50 mV), high current density and excellent stability for the hydrogen evolution reaction (HER) in alkaline solution. Such modified foams show enhanced activity in the oxygen evolution (OER) and reduction (ORR) reaction compared to original Ni-foam.

The present inventors have demonstrated the use of COF with metal nanoparticles with improved interactions by incorporating N-rich heterocycles in multi-fold Heck reactions, aqueous phase C—C couplings and CO oxidation reactions. The $\pi$-system of $sp^2$ hybridized nitrogen interacted with the nanoparticles while still allowing for a planar framework that can stack to form a crystalline 3D structure with large mesopores, a feature specific to COF.

In light of the above, the present inventors observed that there is a scope to provide COF's with suspended redox active non-precious nanoparticles with improved metal-support electronic interactions which allow the splitting of water while achieving a stable, improved catalytic activity and a low overpotential in an oxygen evolution reaction (OER).

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY

In light of the present need for COF's with suspended redox active non-precious nanoparticles, a brief summary of various exemplary embodiments is presented. Some simplifications and omissions may be made in the following summary, which is intended to highlight and introduce some aspects of the various embodiments, but not to limit the scope of the disclosure. Detailed descriptions of a exemplary embodiments adequate to allow those of ordinary skill in the art to make and use the concepts disclosed herein will follow in later sections.

The present disclosure provides a flexible covalent organic framework (COF) which can wrap around the nanoparticles (NP), thereby confining the NP to smaller sizes and improving the contact between the conducting NP and the electronically active support, for higher performance as electro catalysts. The COF's of the present disclosure can limit the size and distribution of nanoparticles (NP) which otherwise is difficult to achieve thereby showing both structural and electronic synergism essential as electro catalysts which the prior art has failed to attain.

Accordingly, the present disclosure provides a novel covalent organic framework (COF) supported noble metal free nanoparticle composite for electro catalytic water splitting. The composite exhibits high electrocatalytic activity for Oxygen Evolution Reaction (OER). The COF supported nanoparticle composite of the present disclosure is stable under the operating conditions of water splitting with no signs of catalyst leaching or surface passivation.

In certain embodiments, the present disclosure provides porous covalent organic framework (COF) supported noble metal-free hydroxides or nitride nanoparticle composites that show both structural and electronic synergism useful for electro catalytic water splitting.

Accordingly, the covalent organic framework (COF) supported transition metal nanoparticle composite of the general formula I comprises:

   I wherein COF may be Tris(4-formylphenyl)amine-terephthaldehyde polymer or benzimidazole-phloroglucinol polymer;

'A' and 'B' each independently represent a transition metal selected from the group consisting of Ni, Co, Fe, Mn, Zn, and mixtures thereof; or 'A' and 'B' together represent a transition metal selected from the group consisting of Ni, Co, Fe, Mn, Zn, and mixtures thereof;

'M' represents a hydroxide or a nitride ion;

'x' and 'y' represent the weight % of the metal loadings in the range 16-18 wt % of total wt % of COF; or 'x' and 'y' together represent the valency of the ion; x=0 to 16 wt % or 0 to 18 wt % and y=0 to 16 wt % or 0 to 18 wt %; or 'x' and 'y' together represents 16 to 18 wt %;

'n' is an integer 1 or 2 or 3.

In various embodiments, 'A' and 'B' represent the same or different transition metals, with each of 'A' and 'B' being selected from the group consisting of Ni, Co, Fe, Mn or Zn and a mixture thereof. In various embodiments, the term 'AxBy' in general formula I means that A and B each represent a transition metal selected from the group consisting of Ni, Co, Fe, Mn and Zn, with a ratio of x:y of between 0:1 and 1:0, between 0.8:0.2 and 0.2:0.8; between 0.75:0.25 and 0.25:0.75, or about 0.5:0.5. Thus, the term 'AxBy' in general formula I may represent a single metal A, where x:y=1:0; a single metal B, where x:y=0:1; or a combination of metals A and B.

In some embodiments, 'A' and 'B' independently represent a transition metal selected from Ni, Co, Fe, Mn or Zn and a mixture thereof;

when 'M' represents hydroxide ion;

'x' and 'y' represent the weight % of the metal loadings in the range 16 to 18 wt % of total wt % of COF; x=0 to 16 wt % or 0 to 18 wt % and y=0 to 16 wt % or 0 to 18 wt %; or 'x' and 'y' together represents 16 to 18 wt %;

'n' is an integer 2 or 3; and

COF represent Tris(4-formylphenyl)amine terephthaldehyde polymer.

In some embodiments, the term 'A' and 'B' each represent a transition metal selected from Ni, Co, Fe, Mn or Zn and a mixture thereof;

'M' represents a nitride ion;

'x' and 'y' together represent the valency of the ion; x=0 to 8 wt % and y=0 to 8 wt %, or 'x' and 'y' together represents 8 wt %;

'n' is 1 or 2 or 3; and

COF represent benzimidazole-phloroglucinol polymer.

In some embodiments, in the term 'AxBy' in general formula I, A and B each represent a transition metal selected from the group consisting of Ni, Co, Fe, Mn, Zn and a mixture thereof, with a ratio of x:y of either 0:1 or 1:0, so that the term 'AxBy' in general formula I represents a single metal A, where x:y=1:0; or a single metal B, where x:y=0:1.

In some embodiments, the electro catalysts of the present disclosure are noble metal-free.

The flexible covalent organic framework (COF) of the present disclosure comprises sp3 nitrogen as supports for noble metal free nanoparticles. The monomer contains tetrahedral nitrogen covalently linked to three p-benzaldehyde units which are completely free to rotate providing flexibility around the tetrahedral nodes, while the lone-pairs on the nitrogen centre make it electronically active. The covalent organic framework comprises Tris(4-formylphenyl)amine as monomer. The COF is designated as IISERP-COF2 developed in the Indian Institute of Science Education and Research, Pune (IISSERP). The COF2 is in the β-phase and forms nano composite with homometallic or heterometallic nanoparticles and show high activity and kinetics towards Oxygen Evolution Reaction (OER).

In an aspect, COF2 or IISERP-COF2 or IISERP-COF2-β are used interchangeably throughout the specification, representing COF2 comprising Tris(4-formylphenyl)amine as monomer in β-phase and the same may be appreciated as such by the person skilled in the art.

Accordingly, the covalent organic framework (COF) supported transition metal nanoparticle 'composite A' of the general formula A comprises;

   A wherein 'A' and 'B' independently represent transition metals selected from Ni, Co, Fe, Mn and Zn; COF2 represents Tris(4-formylphenyl)amine terephthaldehyde polymer; 'x' and 'y' represent the weight % of the metal loadings in the range 16-18 wt % of total wt % of COF2; or x=0 to 16 wt % or 0 to 18 wt % and y=0 to 16 wt % or 0 to 18 wt % or 'x' and 'y' together represents 16-18 wt % of total wt % of COF2.

In an aspect, the IISERP-COF2_AxBy(OH)$_n$, 'composite A', comprises homometallic or heterometallic nanoparticles. In an aspect, the IISERP-COF2_nanoparticles and 'composite A' are used interchangeably throughout the specification representing the covalent organic framework loaded with homometallic or heterometallic nanoparticles and the same may be appreciated as such by the person skilled in the art.

In another preferred aspect, the present disclosure provides covalent organic framework (COF) supported transition metal nanoparticle 'composite 1A' comprising IISERP-COF2_Co/Ni(OH)$_2$ wherein the Co:Ni ratio is 10 mg:30 mg for total 100 mg of COF2.

In yet another aspect, the present disclosure provides a low band gap covalent organic framework (COF) comprising benzimidazole units connected together to an electron rich phloroglucinol type unit to form a polymeric conjugated framework (extended 2D π-electron system) which acts as an electronically active support for metallic nanostructures. These COF are referred to as IISERP-COF3 developed in the Indian Institute of Science Education and Research, Pune. The IISERP-COF3 forms nano composite with nitrides and show enhanced activity and kinetic towards Oxygen Evolution Reaction (OER).

In an aspect, COF3 and IISERP-COF3 are used interchangeably throughout the specification, representing COF comprising benzimidazole-phloroglucinol polymer as monomer and the same may be appreciated as such by the person skilled in the art.

Accordingly, the covalent organic framework (COF) supported transition metal nanoparticle 'composite B' of the general formula B comprises;

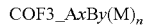

COF3_AxBy(M)$_n$    B wherein 'A' and 'B' together represent a transition metal selected from Ni, Co, Fe, Mn or Zn;

'M' represents a nitride ion;

'x' and 'y' together represent the valency of the ion; x=0 to 8 wt % and y=0 to 8 wt %, or 'x' and 'y' together represent 8 wt %;

'n' is 1, 2 or 3; and COF3 represent benzimidazole phloroglucinol polymer.

In an aspect, the present disclosure provides novel covalent organic framework (COF) supported transition metal nanoparticle 'composite B' of the formula COF3-Ni$_3$N wherein COF3 comprises benzimidazole phloroglucinol polymer.

In another aspect, the IISERP-COF3_Ni$_3$N and 'composite B' are used interchangeably throughout the specification and the same may be appreciated as such by the person skilled in the art.

In another aspect, the present disclosure provides a process for preparing IISERP-COF2 and IISERP-COF2_AxBy (OH)$_2$ 'composite A' by solvent method. IISERP-COF2 is prepared by reacting Tris(4-formylphenyl)amine and 1,4-diaminobenzene in a mixture of polar protic or aprotic solvents to obtain IISERP-COF2. This is followed by loading transition metal nanoparticles on to the COF2 comprising mixing metal salt solution and COF2 suspended in a non-polar solvent followed by reduction of metal ($M^{2+}$) in an aqueous medium.

In an aspect, IISERP-COF2 synthesized in its solvated form represents α-phase which transforms to β-phase upon desolvation and loading of nanoparticles is carried on to IISERP-COF2-β.

In yet another aspect, IISERP-COF3 is prepared by reacting 3, 3'-diaminobenzidine and 1,3,5-triformyl phloroglucinol in a mixture of organic solvents. The synthesis can be performed both at high temperature as well as at room temperature.

In another aspect, the present disclosure provides a process for preparing IISERP-COF3_Ni$_3$N 'composite B' comprising adding a mixture of Nickel acetate tetra hydrate and urea or hexamethylenetetramine to as prepared IISERP-COF3 and annealing.

In yet another aspect, the present disclosure provide a method for quantifying the oxygen evolution generated during electro splitting of water using the electro catalysts of Formula (I).

BRIEF DESCRIPTION OF THE DRAWINGS

In order to better understand various exemplary embodiments, reference is made to the accompanying drawings, wherein:

FIG. 2 illustrates 77K Nitrogen adsorption isotherm of the COF2 suggesting micropores. The inset shows the pore size being bimodal with 18 and 22 Å pores.

FIG. 3A illustrates the PXRD of the 'composite-1A' showing the presence of peaks corresponding to Ni(OH)$_2$ nanoparticles.

FIG. 3A illustrates the IR spectra of 'composite 1A' (Top trace); the IR spectra of IISERP-COF2 in its α form (Middle trace); and the IR spectra of IISERP-COF2 in its β form (Bottom trace).

FIG. 6D illustrates the TEM image of IISERP-COF3 showing well-dispersed nanoparticles of the as-made COF.

FIG. 6E illustrates the Scalability and stability of IISERP-COF3 inferred from 77K N2 adsorption isotherm.

FIG. 6F illustrates the Pore size fits modelled using DFT methods using the 77K N2 isotherms.

DETAILED DESCRIPTION

Figure 1A:
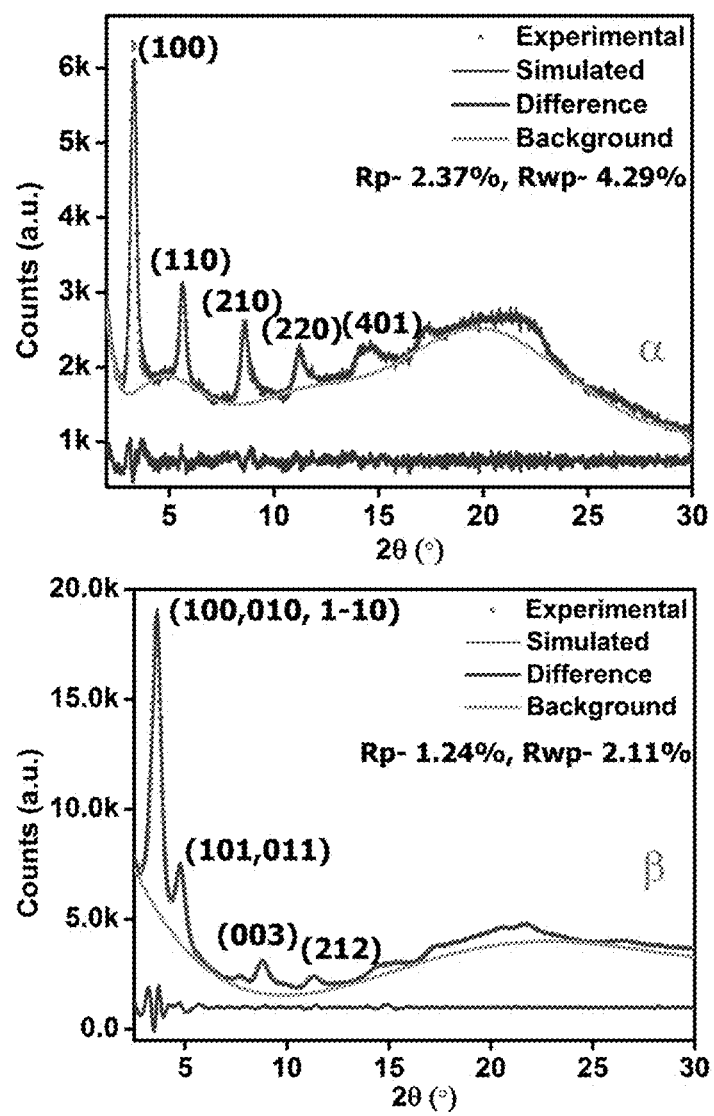
FIG. 1A illustrates the Pawley fit for the solvated phase (Top); and for the desolvated phase (Bottom).
Figure 1B:
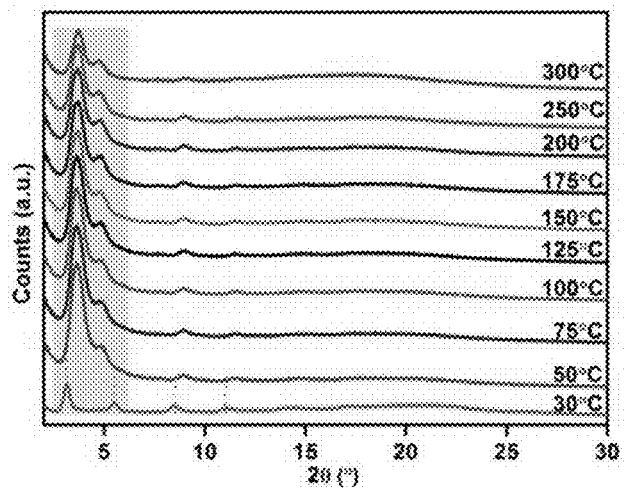
FIG. 1B illustrates the variable temperature PXRD analysis showing the transformation of α-phase to β upon desolvation, the dotted lines indicate the shrinking of the a-axis and expansion of the c-axis during this irreversible phase transformation.

Various embodiments will now be described with reference to certain preferred and optional features, so that the various aspects therein will be more clearly understood and appreciated.

The catalytic activity of covalent organic framework (COF) can be improved by modulation of the support by periodic replacement of carbon atoms of a phenyl group with more electronegative organic elements which could reduce the activation energy associated with the anodic evolution reaction during electrolysis of water and also improve the charge/mass transfer kinetics. Further, introducing specific characteristics in the COF framework also enhances the interaction of guest nanoparticles with the host support which is useful to lower the over potential during electro catalytic water splitting or to be with par to the acceptable value of the art.

In a preferred embodiment, the present disclosure describes porous covalent organic framework (COF) supported transition metal nanoparticle, in the form of metal or its hydroxides or nitrides, composites that show both structural and electronic synergism useful for electro catalytic water splitting.

Accordingly, the present invention discloses novel covalent organic framework (COF) supported transition metal nanoparticle composites of the general formula I;

COF_AxBy(M)n     I wherein COF is selected from Tris(4-formylphenyl)amine terephthaldehyde polymer or benzimidazole-phloroglucinol polymer;

'A' and 'B' represents independently transition metals selected from Ni, Co, Fe, Mn or Zn;

'M' represents hydroxide or a nitride ion;

'x' and 'y' represent the weight % of the metal loadings in the range 16-18 wt % of total wt % of COF; or 'x' and 'y' together represent the valency of the ion; or x=0 to 16 wt % or 0 to 18 wt % and y=0 to 16 wt % or 0 to 18 wt %; or 'x' and 'y' together represents 16 to 18 wt %;

'n' is an integer 1 or 2 or 3;

with the proviso that when 'A' and 'B' independently represent transition metals selected from Ni, Co, Fe, Mn and Zn:

'M' represents hydroxide ion;

'x' and 'y' represent the weight % of the metal loadings in the range 16-18 wt % of total wt % of COF; x=0 to 16 wt % or 0 to 18 wt % and y=0 to 16 wt % or 0 to 18 wt %; or 'x' and 'y' together represents 16 to 18 wt %;

'n' is an integer 2 or 3; and

COF represent Tris(4-formylphenyl)amine terephthaldehyde polymer; or with the proviso that when 'A' and 'B' together represent a transition metal selected from Ni, Co, Fe, Mn and Zn:

'M' represents a nitride ion;

'x' and 'y' together represent the valency of the ion; x=0 to 8 wt % and y=0 to 8 wt %; or 'x' and 'y' together represents 8 wt %;

'n' is 1 or 2 or 3; and

COF represent benzimidazole-phloroglucinol polymer.

In an embodiment, the electro catalyst of the present invention is noble metal free.

In an embodiment, the present invention discloses covalent organic framework (COF) supported transition metal nanoparticle 'composite A' of the general formula A;

$COF2\_A_xB_y(OH)_2$     A wherein 'A' and 'B' represent independently transition metals selected from Ni, Co, Fe, Mn and Zn;

COF2 represents Tris(4-formylphenyl)amine terephthaldehyde polymer; and

'x' and 'y' represent the weight % of the metal loadings in the range 16-18 wt % of total wt % of COF; or x=0 to 16 wt % or 0 to 18 wt % and y=0 to 16 wt % or 0 to 18 wt %; or "x' and 'y' together represents 16-18 wt % of total wt % of COF2. In an embodiment, the COF2 support material comprises the stable β-phase configuration which is stable up to 450° C.

The IISERP-COF2_AxBy(OH)2 'composite A' of the present disclosure may be loaded with homometallic or heterometallic nanoparticles. In an embodiment, the IISERP-COF2 forms a composite with 16 wt % Co (1) or 16 wt % of Ni (2) or 8 wt % Co+8 wt % Ni (3) or 12 wt % Co+4 wt % Ni (4) or 4 wt % Co+12 wt % Ni (5 or 1A).

In a preferred embodiment, the present invention discloses covalent organic framework (COF) supported transition metal nanoparticle 'composite 1A' comprising IISERP-COF2_Co/Ni(OH)2 wherein the Co:Ni ratio is 10 mg:30 mg for 100 mg of COF2.

In another preferred embodiment, the present invention discloses covalent organic framework (COF) supported transition metal nanoparticle 'composite B' of the formula COF3_Ni₃N wherein COF3 comprises benzimidazole units connected to a phloroglucinol core to form a polymeric conjugated framework.

In an embodiment, the present invention relates to a process for synthesis of covalent organic framework (COF) supported transition metal nanoparticle 'composite A' of the general formula;

COF2_A$_x$B$_y$(OH)$_2$ wherein 'A' and 'B' represents independently transition metals selected from Ni, Co, Fe, Mn and Zn;

COF2 represents Tris(4-formylphenyl)amine terephthaldehyde polymer;

'x' and 'y' represent the weight % of the metal loadings in the range 16-18 wt % of total wt % of COF2; or x=0 to 16 wt % or 0 to 18 wt % and y=0 to 16 wt % or 0 to 18 wt %; or "x' and 'y' together represents 16-18 wt % of total wt % of COF2. The process comprises:
i. heating a mixture of Tris(4-formylphenyl)amine, 1,4-diaminobenzene in polar protic or non-polar solvents either alone or in combination thereof and aq. acetic acid under the conditions suitable to form solvated IISERP-COF2 in α-phase;
ii. desolvating IISERP-COF2-α to obtain stable IISERP-COF2 in β phase; and
iii. adding hydrated metal salt solution (MCl$_2$.6H$_2$O) to a suspension of IISERP-COF2-3 in a solvent followed by reduction of metal ion (M$^{2+}$) in aqueous medium to obtain the desired composite.

In another preferred embodiment, the present invention discloses covalent organic framework (COF) supported transition metal nanoparticle 'composite B' of the formula COF3_Ni₃N wherein COF3 comprises benzimidazole units connected to a phloroglucinol core to form a polymeric conjugated framework.

The solvent is selected from polar protic solvents such as lower alcohols, formic acid, acetic acid and the like; organic solvent such as Dioxan, DMF, THF, halogenated hydrocarbons, 1,4 dioxane, mesitylene and the like; either alone or in combination thereof.

Suitable reaction conditions include heating the reaction mixture of step (i) to form solvated IISERP-COF2 in α-phase at a temperature in the range of 110-130° C. for about 70-80 hours. The desolvation is achieved by drying the contents in an oven at about 120° C. for about 3-4 days. The aqueous phase reduction preferably results in the formation of composites as the respective hydroxides suspended in the IISERP-COF2-β matrix.

The transformation of α-phase to β-phase of IISERP-COF2 during desolvation is an irreversible process. The IISERP-COF2-β obtained in step (ii) is stable up to temperature of 450° C.

In an embodiment, the IISERP-COF2-β is loaded with homometallic or heterometallic nano particles. Accordingly, IISERP-COF2 is loaded with 16 wt % Co (composite 1) or 16 wt % of Ni (composite 2) or 8 wt % Co+8 wt % Ni (composite 3) or 12 wt % Co+4 wt % Ni (composite 4) or 4 wt % Co+12 wt % Ni (composite 5 or 1A).

The IISERP-COF2-β formed extremely thin wafers of COF2 with a bimodal pore size distribution with pore sizes 19 and 21 Å and has BET and Langmuir surface areas 557 and 866 m$^2$/g, respectively. The composite contain the nanoparticles with sizes<3 nm.

In another embodiment, the present invention discloses a process for preparing IISERP COF3_Ni₃N 'composite B' comprising:

i. reacting 3,3'-diaminobenzidine and 1,3,5-triformyl phloroglucinol in a mixture of solvents at a temperature ranging from r.t to 130° C. to obtain IISERP-COF3; and
ii. adding a mixture of grounded Nickel acetate tetra hydrate and urea or hexamethylenetetramine to IISERP-COF3 powder; and
iii. annealing the mixture of step (ii) to obtain composite B.

The milligram scale solution reaction for synthesis of IISERP-COF3 has been carried out in 10 gram scale with a facile scale-up procedure.

The transformation of α-phase to β-phase of IISERP-COF2 during desolvation is an irreversible process. The IISERP-COF2-β obtained in step (ii) is stable up to temperature of 450° C.

The solvents for the process are selected from non-polar solvents such as mesitylene and polar solvents such as 1,4-dioxane, THF, DMF and the like. Suitable reaction conditions include maintaining the temperature of step (i) in the range of 110-130° C. for about 70-75 hours. The nanoparticles are loaded on to the COF via a solid state synthesis comprising grinding the mixture of COF3 with Nickel acetate tetra hydrate and urea or hexamethylenetetramine and heating the mixture to a temperature in the range of 300-400° C. for about 6 hrs.

The composite B obtained is further characterized by FE-SEM, HRTEM, PXRD as shown in FIG. 6. The IISERP-COF3 is two-dimensional structure built from hexagonal layers separated by a distance of 3.69 Å and are held together by π-stacking interactions between the aromatic rings and has BET surface area of 403 m$^2$/g. The particle size of Ni₃N is approx. 2 nm.

In yet another embodiment, the present invention relates to a method for splitting water at low overpotential comprising contacting the aqueous solution containing electrolyte with the electrocatalyst of formula (I).

The present invention can produce not only oxygen but also electrons and protons that can be further reduced to produce hydrogen.

In an embodiment, the present invention relates to a method for splitting of water using the electro catalysts of composite A or composite B. The electro catalysts of the present invention are coated on a glassy carbon electrode and serve as a working electrode in a three electrode test cell. The catalyst mass loading is maintained at 20 μg for all the electrochemical studies of IISERP-COF2_nanoparticle composites (composite A) and 5 μg for IISERP-COF3 nanoparticle composite-B. The water which is subjected to oxidative splitting is in the form of aqueous solution containing an electrolyte.

In an embodiment, the electrolyte is de-aerated 0.1 M KOH when the catalyst is IISERP-COF2_nanoparticle composite A.

In an embodiment, the electrolyte is de-aerated 1M KOH when the catalyst is IISERP-COF2_nanoparticle composite B.

The method for the oxygen evolution comprises bringing aqueous solution containing 0.1M KOH into contact with the water splitting catalyst comprising COF2_AxBy(OH)$_2$; wherein 'A' and 'B' represents independently transition metals selected from Ni, Co, Fe, Mn or Zn; COF2 represents Tris(4-formylphenyl)amine; 'x' and 'y' represent the weight % of the metal loadings in the range 16-18 wt % of total wt % of COF2; or x=0 to 16 wt % or 0 to 18 wt % and y=0 to 16 wt % or 0 to 18 wt %; or "x' and 'y' together represents 16-18 wt % of total wt % of COF2.

The IISERP-COF2 forming a composite with 16 wt % Co (1) or 16 wt % of Ni (2) or 8 wt % Co+8 wt % Ni (3) or 12 wt % Co+4 wt % Ni (4) or 4 wt % Co+12 wt % Ni (5 or 1A) are evaluated for oxygen evolution reaction (OER) and associated charge transfer kinetics. The results are provided in Table 1 below.

In an embodiment, the over potential for IISERP-COF2 nanoparticle 'composite A' ranged from 245 to 255 mV at current density of 10 mA/cm$^2$. In a preferred embodiment, the composite 5 or 1A comprising IISERP-COF2 loaded with 4 wt % Co and 12 wt % Ni shows the OER characteristics with lowest onset potential at 1.43V and over potential of 250 mV at current density of 10 mA/cm$^2$.

In another embodiment, the method for quantifying the oxygen evolution comprises bringing aqueous solution containing 1M KOH into contact with the water splitting catalyst comprising IISERP-COF3_Ni$_3$N wherein COF3 comprises benzimidazole units connected together to form a polymeric conjugated framework; to split the water. The Composite-B, IISERP-COF3_Ni$_3$N, has an onset potential at 1.44V and an overpotential of 230 mV@10 mA/cm$^2$. Further, the composite-B is capable of delivering current densities of 350 mA/cm$^2$ in 1 M KOH.

In yet another embodiment, the kinetics associated with the mass transfer at the electrode-electrolyte contacts were examined using a Tafel plot (with 75% IR-compensation). The values ranged from 38 mV/decade to 91 mV/decade of current for composites A and B, respectively. Specifically, IISERP-COF2 loaded with 4 wt % Co and 12 wt % Ni composite showed a low value of 38 mV/decade. The composite-B, IISERP-COF3_Ni$_3$N showed a value of 79 mV/decade. The low values indicate that the electrocatalysts of composite A and composite B have good charge transfer activity.

An important parameter that assesses the activity of metal nanoparticles during the oxygen evolution reaction (OER) is the Turn Over Frequency (TOF). The TOF estimated for composite A and composite B are 0.186170 s$^{-1}$@overpotential of 400 mV and 0.52 s$^{-1}$@overpotential of 300 mV, respectively. The values indicate that the electrocatalysts of the present invention is about six- and twenty-fold higher in their activity than that obtained with the benchmarked Ir/C (0.027 s$^{-1}$).

In an embodiment, the electrocatalyst of the present invention comprising Composite A and Composite B are stable even after 500 cycles with minimal current loss, minimum surface passivity.

In yet another embodiment, the present invention relates to the use of electro catalyst consisting of covalent organic framework (COF) supported transition metal nanoparticle composites of the general formula I for use in water splitting system.

The water splitting electrocatalyst of the present invention is useful in productions of oxygen, protons, hydrogen, electrons, hydrocarbons, and the like using water as the raw material.

Further details of the present invention will be apparent from the examples presented below. Examples presented are purely illustrative and are not limited to the particular embodiments illustrated herein but include the permutations, which are obvious as set forth in the description.

Example 1: Synthesis of IISERP-COF2-β

Tris(4-formylphenyl)amine (40 mg, 0.12 mmol) and 1,4-diaminobenzene (20 mg, 0.19 mmol) were weighed into a Pyrex tube and dissolved in ethanol (3.0 mL). To the mixture O-dichlorobenzene (3.0 mL) was added and stirred until a clear yellow solution was observed. This was followed by addition of 0.25 mL of aqueous acetic acid (3 M solution). The Pyrex tube was flash frozen in a liquid nitrogen bath and sealed. The Pyrex tube along with its contents was placed in an oven at 120° C. for 3 days to obtain about 48 mg of yellow coloured solid which was washed with DMF, dioxane, MeOH, Acetone and THF.

Isolated yield: 86%; (Formula for COF: C$_{240}$N$_{32}$H$_{168}$, Mol. wt. 3500.2 g/mol, CHN Obsd. C=77.35%; H=4.409%; N=10.85%. Calc. 82.36%; H=4.84%; N=12.81%).

Example 2: Characterization of IISERP-COF2-α and IISERP-COF2-β

Figure 1C:
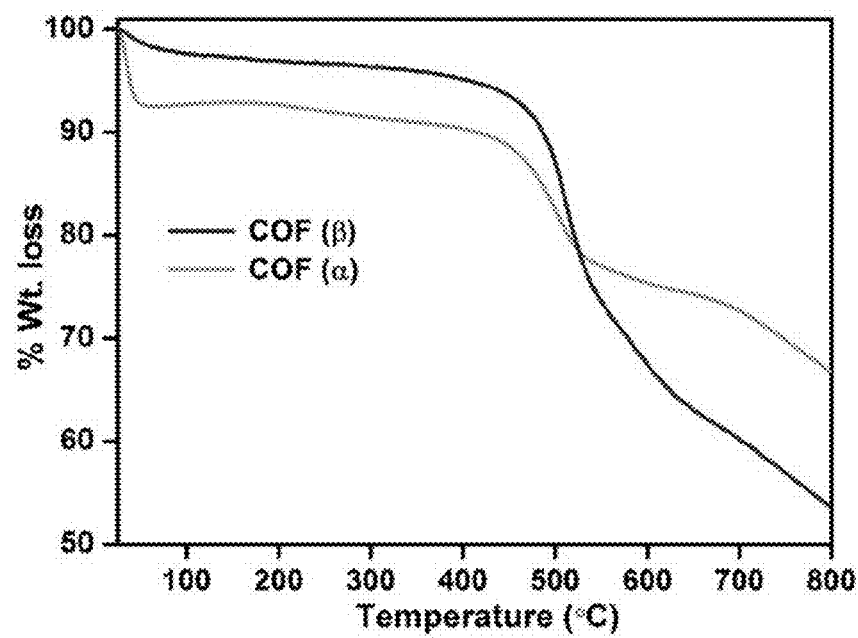
FIG. 1C illustrates the TGA of the IISERP-COF2 in its α and β forms.
Figure 4A:
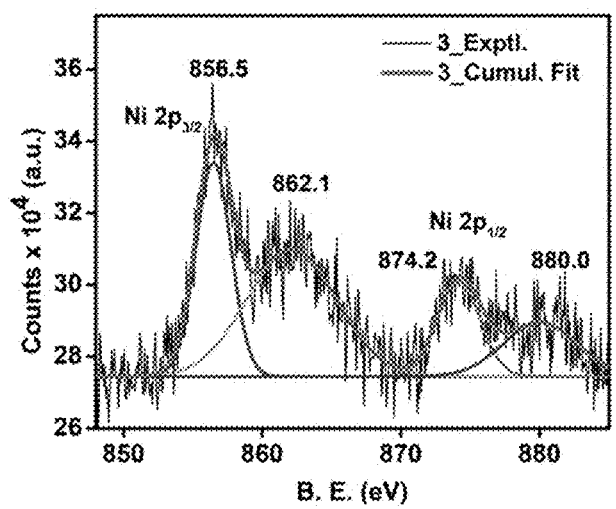
FIGS. 4A through 4D illustrate the XPS spectra of the composite with the metal loading ratio of 4Co:12Ni—COF or 'composite-1A'. The binding energy (BE) values calculated using fitted profiles. Note: the numbers indicate the wt. % of metal loading and COF refers to IISERP-COF2.
Figure 4B:
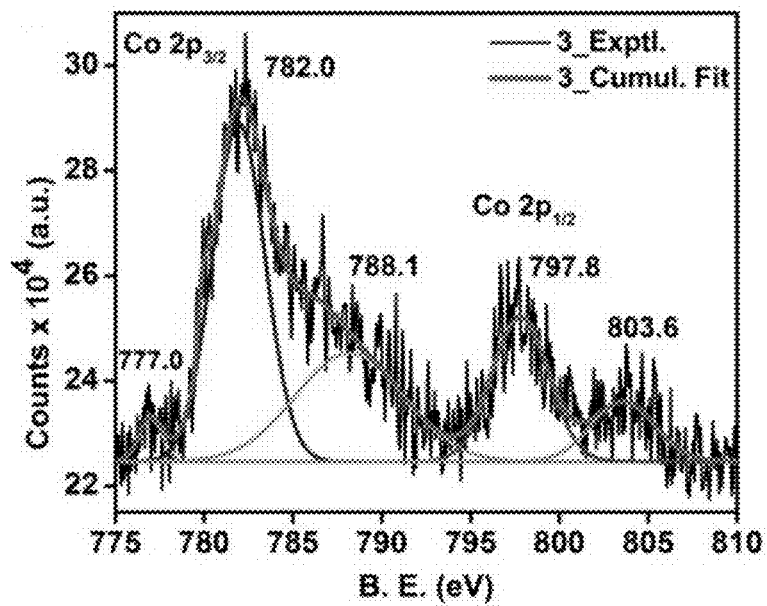
Figure 4C:
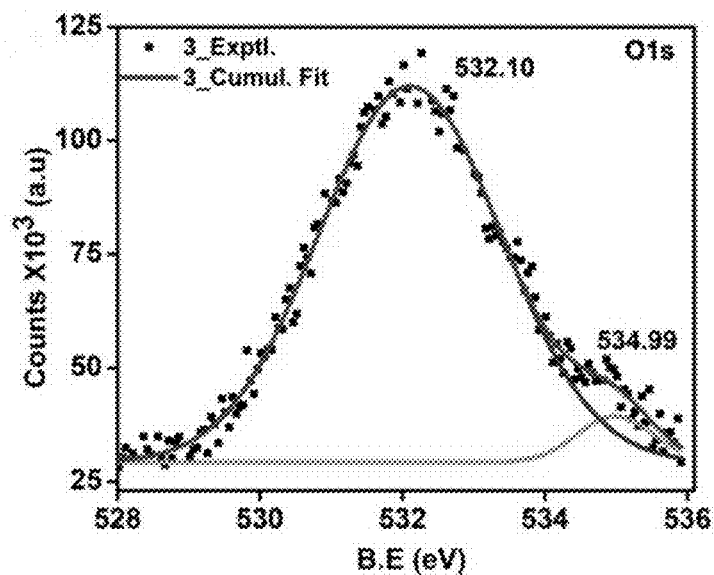
Figure 4D:
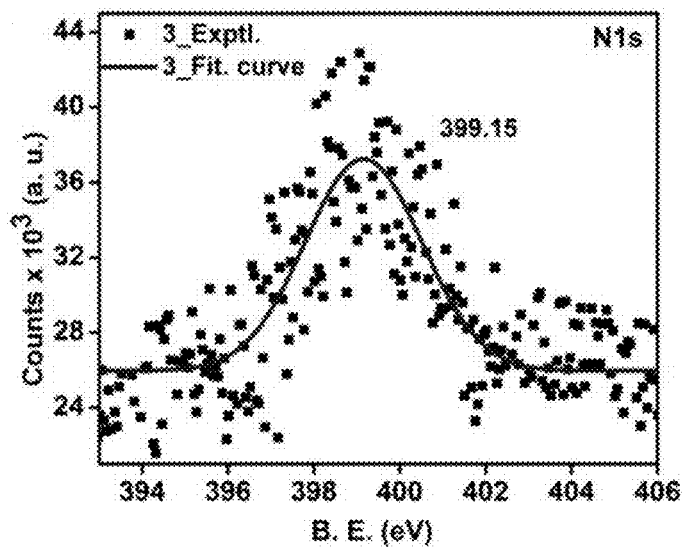

Pawley-Le Bail Method (in P6/m) reveal unit cell for IISERP-COF2-α: a=b=31.71(3); c=10.25(1); IISERP-COF2-β: a=b=29.43(3); c=28.48(4)Å, The hexagonal layers of the IISERP-COF2-(3, show ABAB . . . arrangement with uniform triangular-shaped 18.5 Å pores along the ab-plane which agree well with the pore size determined from adsorption studies. The layers are held together by a six-point C—H . . . Phenyl type interactions and their buckling results in uniform cavities (22 Å) along the interlayer spaces. PXRD studies showing stability of the IISERP-COF2 are shown in (FIG. 1A). TGA of the IISERP-COF2 in its α and β forms are shown in (FIG. 1C).

The Field emission SEM patterns of the IISERP-COF2-(3 showed the growth of uniform hexagonal flakes. These hexagonal flakes stack among themselves to form large sheet structures which seem to wrap in-wards around their corners particularly once they reach sizes>500 nm as revealed by HRTEM. A 77K Nitrogen adsorption isotherm of the COF disclose that the IISERP-COF2-β possess a bimodal pore size distribution with pores of the sizes 18 and 22 Å pores (FIG. 2).

Example 3: Synthesis of IISERP-COF2-β_Co/Ni(OH)$_2$ composite (1A)

IISER-COF2-β (100 mg) was suspended in 20 mL of n-hexane and the mixture was sonicated for about 30 min until it became yellow color homogeneous suspension. To this, a solution containing NiCl$_2$.6H$_2$O (20 mg) and CoCl$_2$.6H$_2$O (20 mg) dissolved in 1 mL of MeOH was added drop by drop over period of 3 h with vigorous stirring until the color changed from yellow to wine. Stirring was continued for about 12 h at room temperature. The solid particles settled down and the solvent was decanted. Resulting solid was dried at room temperature for 12 hrs and the wine colored powder was maintained at 150° C. for 12 h. To this was added about 20 mL of Millipore water followed by addition of 25 mL of freshly prepared 0.6 M aqueous NaBH$_4$ solution. The product was a dark green suspension and the solid was collected by centrifuging, drying under vacuum. CHN % Obsd. (Calc. % within brackets): C=60.73 (62.47); H=4.45 (4.19); N=8.92 (9.71).

The as prepared IISERP-COF2-3_Co/Ni(OH)$_2$ composite 1A was characterized by PXRD (FIG. 3A) and IR spectra (FIG. 3B). The loading of metal nanoparticles on to COF2 was determined by XPS spectra (FIG. 4A to 4D).

The heterometallic composites with varying metal ratios were prepared by the procedure disclosed in example 3. For preparation of heterometallic composites 100 mg of COF was used and 40 mg of the metal salt.

Figure 5A:
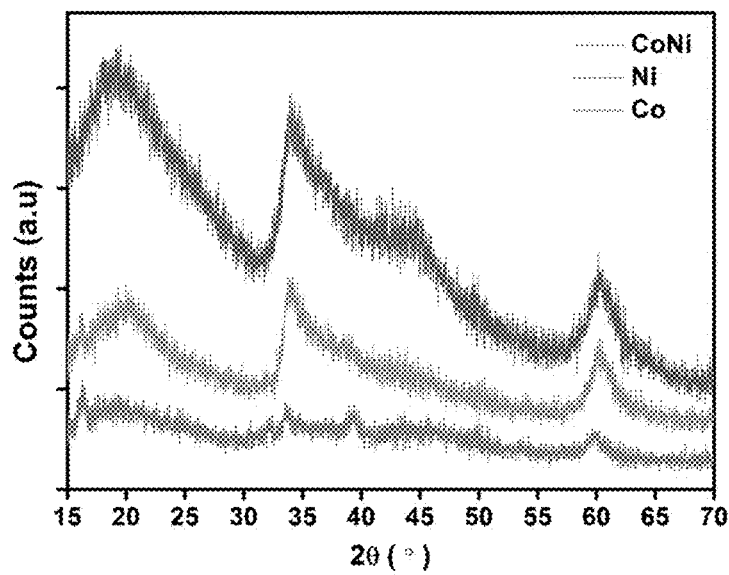
FIG. 5A illustrates a PXRD studies showing the peaks corresponding to the Co nanoparticles (Lower trace), Ni nanoparticles (Upper trace), and Co—Ni nanoparticles (Middle trace) obtained from their composites with IISERP-COF2.
Figure 5B:
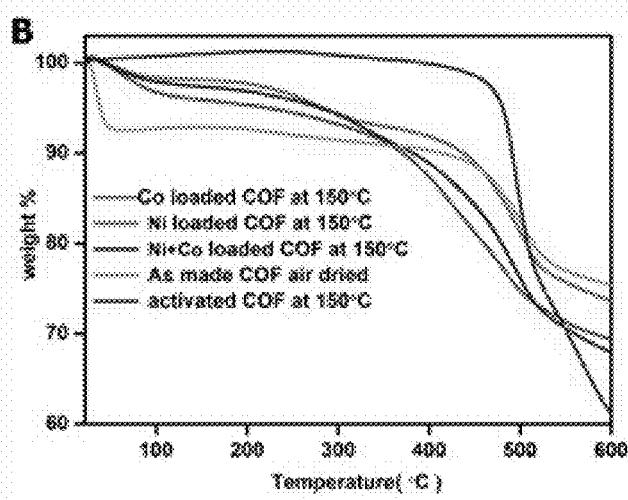
FIG. 5B illustrates the TGA of the IISERP-COF2 and its metal nanoparticles composites. Note: COF in this figure represents the IISERP-COF2.
Figure 5C:
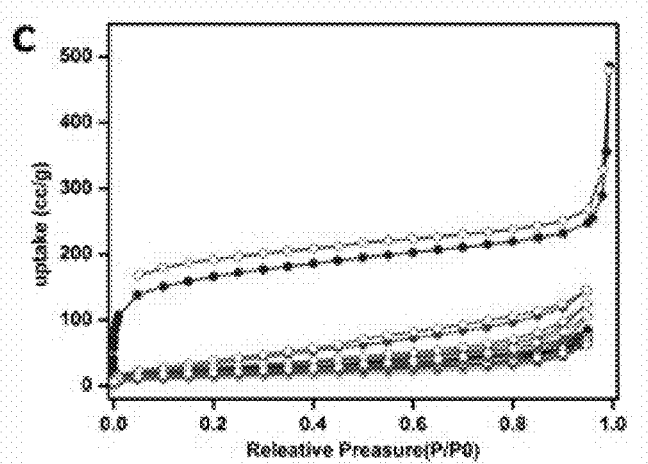
FIG. 5C illustrates the nitrogen adsorption isotherm at 77K of the IISERP-COF2 and its Co, Ni, Co—Ni composites showing the drop in porosity upon Nanoparticle loading.
Figure 6A:
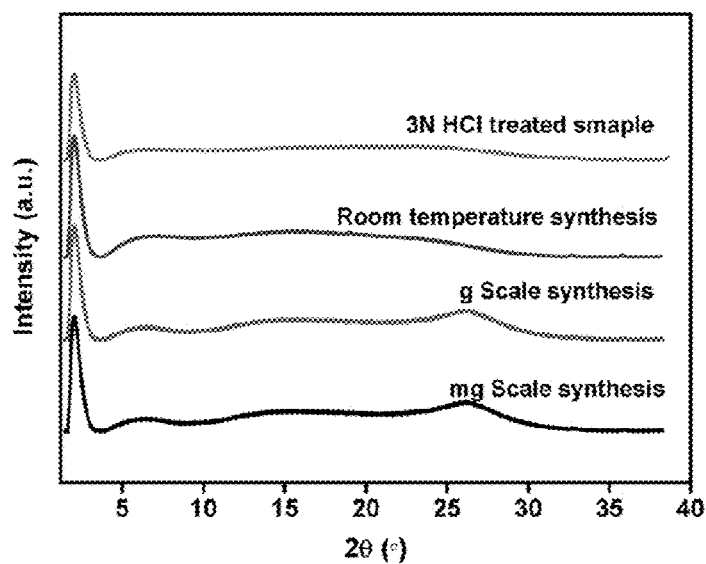
FIG. 6A illustrates PXRD studies showing scalability and stability of the IISERP-COF3.
Figure 6B:
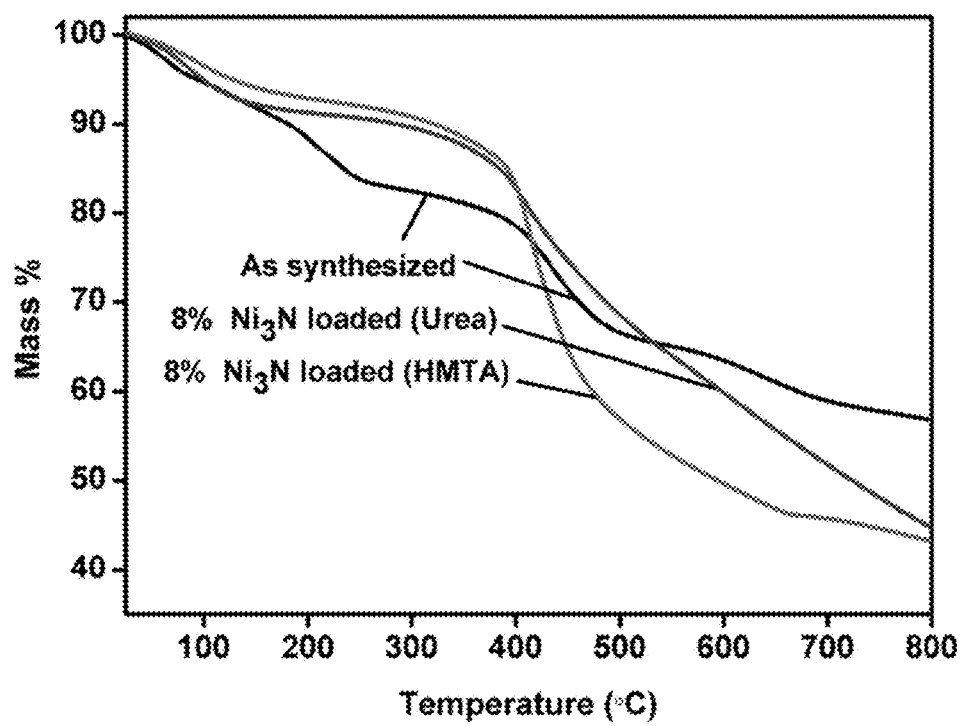
FIG. 6B illustrates the TGA of the IISERP-COF3 and the composite-2 synthesized from Urea and HMTA methods.
Figure 6C:
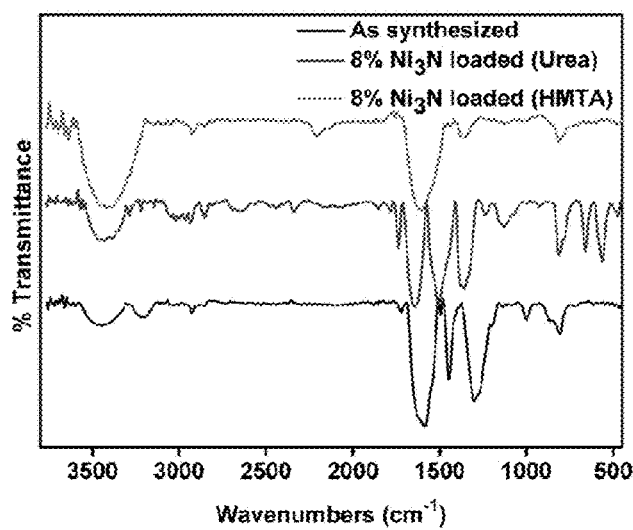
FIG. 6C illustrates the IR spectra of the IISERP-COF3 (As synthesized; bottom trace) and the 'composite-B' synthesized from the Urea method (Middle trace) and the HMTA method (Upper trace).
Figure 6G:
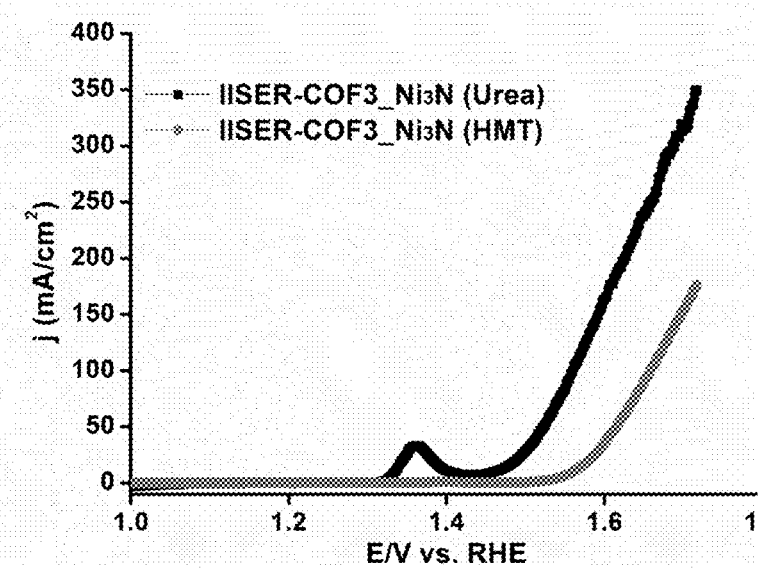
FIG. 6G illustrates the High resolution XPS spectra of composite-B.
Figure 6H:
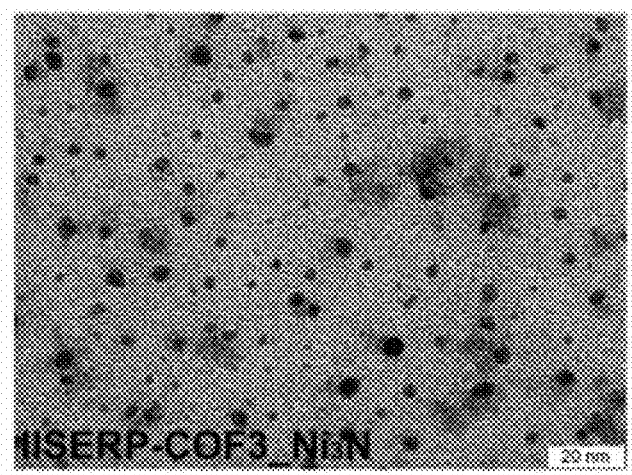
FIG. 6H illustrates the HRTEM image of the 'composite-B' showing homogeneous distribution of $Ni_3N$ nanoparticles on the COF surface.
Figure 6I:
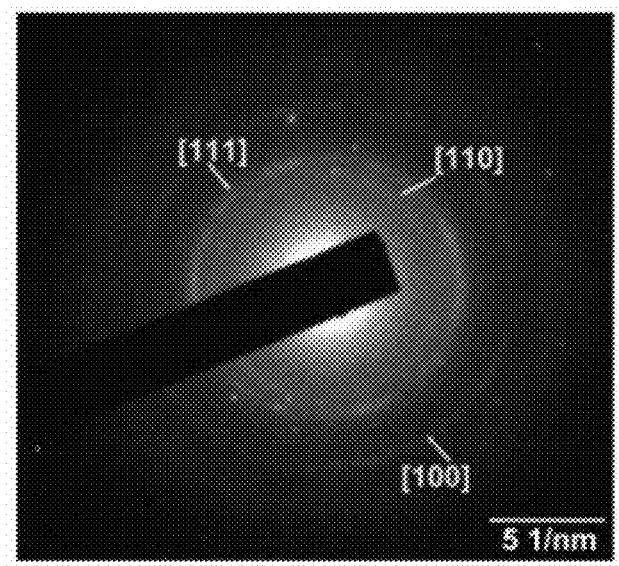
FIG. 6I illustrates the SAED diffraction image of the 'composite-B' showing the peaks corresponding to $Ni_3N$.
Figure 7A:
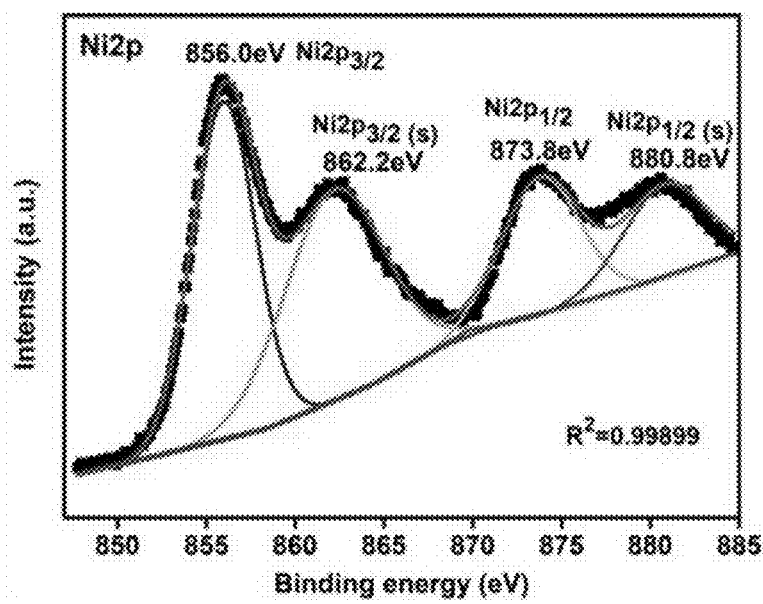
FIGS. 7A through 7D illustrate High resolution XPS spectra of Composite-2. Lines—fitted data, dots—experimental data and red line-background.
Figure 7B:
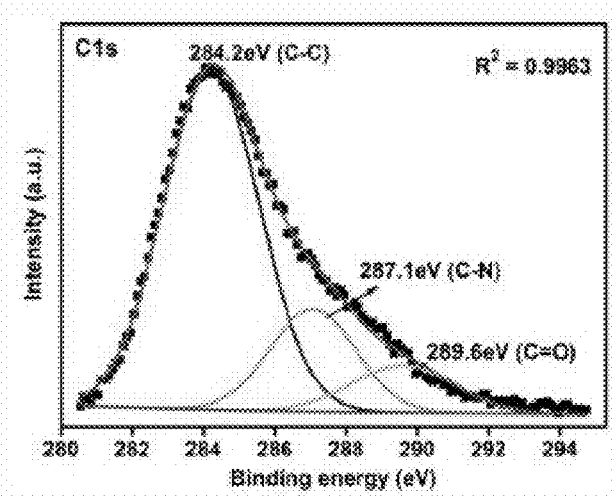
Figure 7C:
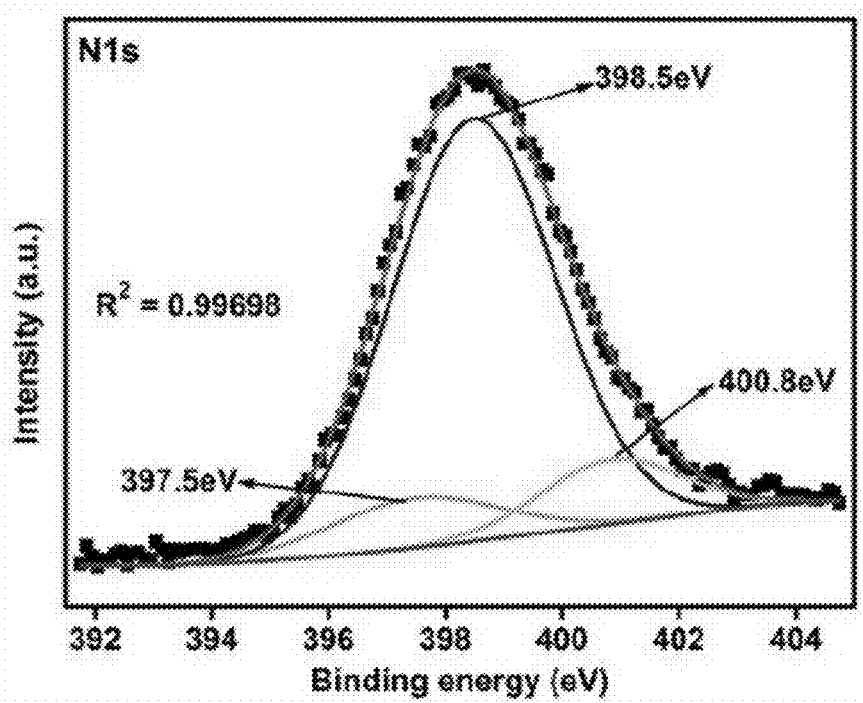
Figure 7D:
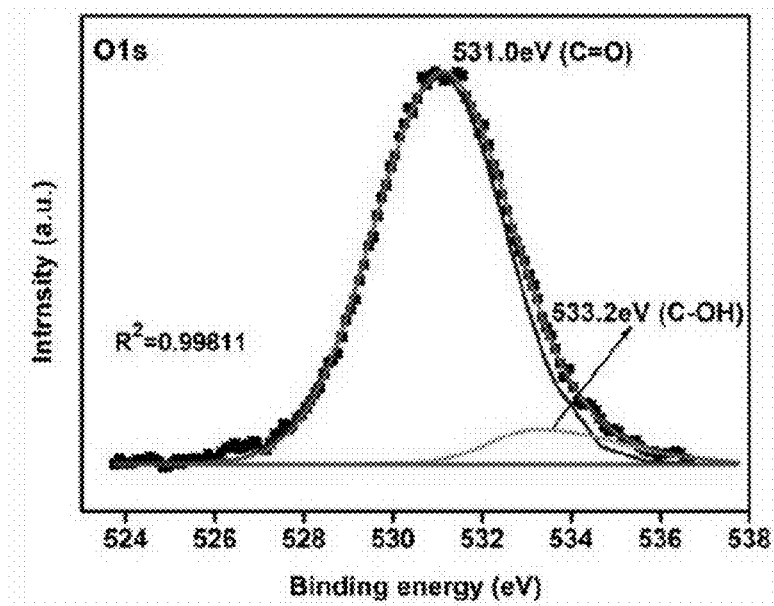

To prepare heterometallic composites comprising of Co and Ni, the Co:Ni ratio employed were: 20 mg Co:20 mg Ni, 10 mg Co:30 mg Ni, 30 mg Co:10 mg Ni. In all the cases approx. 16 to 18% metal loading was observed. The as-prepared composites were further characterized (FIG. 5A to 5C).

Example 4: Synthesis of Homometallic-IISER-COF2-β Composites

The COF (100 mg) was dispersed in 20 mL of n-hexane and the mixture was sonicated for about 30 min resulting in a yellow color suspension. To this, a clear methanolic solution of $NiCl_2.6H_2O$ or $CoCl_2.6H_2O$ (40 mg in 0.5 mL of MeOH) was added drop by drop over period of 3 h with vigorous stirring until the color of the suspension changed from yellow to deep orange color. The contents were further stirred for 12 h at room temperature and the solid particles were extracted by decanting the solvent and dried at room temperature. They were further heated at 150° C. for 12 h and then cooled to room temperature. The resulting orange solid was then washed with copious amounts of Millipore water (50 mL) and ethanol (25 mL). The deep-orange solid was further suspended in 20 mL of water and reduction was carried out by adding 25 mL freshly prepared 0.6 M aqueous $NaBH_4$ solution under vigorous stirring to obtain COF supported Nickel or Cobalt catalysts as a dark green solid. The synthesized samples were collected by centrifuging, dried under vacuum and used for the catalytic studies. Also, the final green solid even upon sonicating in water did not seem to produce any colored solution, suggesting lack of any unreacted or unloaded $Ni^{2+}$ salts that could be leaching out. The EDAX analyses of solid extracted from aqueous supernatant confirmed the absence of any metal. In addition, the EDAX analysis carried out on the extracted metal-COF composite showed no trace of chloride ions. (CHN % Obsd. Ni—COF with ~15-16% Ni loading (Calc. % within brackets): C=61.60 (62.49); H=4.35 (4.20); N=9.13 (9.72) and CHN Obsd. Co COF with ~15-16% Co loading: C=62.32 (62.45); H=4.45 (4.19); N=9.24 (9.71).

Example 5: Synthesis of IISERP-COF3 at High Temperature (HT)

In a 20 ml pyrex tube, 1,3,5-tri formyl phloroglucinol (0.053 g, 0.25 mmol) was dissolved in a mixture of 2 ml mesitylene and 4 ml 1,4-dioxane. To this solution, 3,3-diaminobenzidine (0.082 g, 0.38 mmol) was added under vigorous stirring and contents were stirred at room temperature for 30 mins. A deep red colored slurry was formed. 0.5 ml of aqueous acetic acid was added to the mixture and stirred for another 30 mins. The tube was then purged with $N_2$ and flash frozen in liquid nitrogen. The tube was sealed under nitrogen flow and heated to 120° C. for 3 days. After the reaction mixture was cooled to room temperature bright red color fluffy powder was isolated by vacuum filtration and was subjected to vigorous washings with DMF, DMA, acetone and finally with copious amount of THF. The bright red color product was dried in an oven before further characterization.

The yield was 83% with respect to triformylphloroguicinol; CHN values (calculated values in % within brackets): C: 70.23(68.86); H: 4.12 (3.26); N: 16.42 (17.80).

Example 7: Synthesis of IISERP-COF3 at Room Temperature (RT)

To a 20 ml conical flask, 1,3,5-tri formyl phloroglucinol (0.053 g, 0.25 mmol) was dissolved in a mixture of 2 ml Mesitylene and 4 ml 1,4-dioxane. Following this 3,3-diaminobenzidine (0.082 g, 0.38 mmol) was added to the mixture under vigorous stirring. Contents were stirred at room temperature for 30 mins. A deep red color slurry was formed. 0.5 ml of aqueous acetic acid was added to the mixture and stirred for another 30 min. Bright red color fluffy powder was isolated by vacuum filtration and was washed with DMF, DMA, acetone and finally with copious amounts of THF. The bright red color product was dried in hot air oven before further characterization.

Yield was 78% with respect to triformylphloroguicinol. CHN values (calculated values in % within brackets): C: 69.23(68.86); H: 4.86 (3.26); N: 16.12 (17.80).

Example 8: Synthesis of IISERP-COF3 at Room Temperature (RT) (Gram Scale)

To a 100 ml conical flask, 1,3,5-tri formyl phloroguicinol (0.53 g, 2.5 mmol) was dissolved in a mixture of 10 ml Mesitylene and 30 ml 1,4-dioxane. Following this 3,3-diaminobenzidine (0.82 g, 3.8 mmol) was added to the mixture under vigorous stirring and the stirring was continued at room temperature for 1 hr. Homogeneous deep red color slurry was formed. 0.5 ml of aqueous acetic acid was added to the mixture and stirred for another 1 hr. The final product, a bright red color fluffy powder was isolated by vacuum filtration and was subjected to vigorous washings with DMF, DMA, acetone and finally with copious amount of THF and was dried in an oven before further characterization.

Yield was 78% with respect to triformylphloroguicinol. CHN values (calculated values in % within brackets): C: 69.78(68.86); H: 4.67 (3.26); N: 16.02 (17.80)

Example 9: Structural Characterization of IISERP-COF3

Pawley and Le Bail Method (in P6/m) reveal two-dimensional structure built from hexagonal layers for IISERP-COF3 with unit cell dimensions: a=b=55.87(5); c=3.53(7)Å; Pawley refinement statistics: Rp=4.52%; wRp=5.20%. The layers of the IISERP-COF3, had an AAA . . . stacking with hexagonal shaped 29 Å pores along the ab-plane. The layers were separated by a distance of 3.53 Å and held together by π-stacking interactions between the aromatic rings. The energy estimated for this configuration using Tight Binding Density Functional Theory (DFTB) method was observed to be the lowest of all the attempted space groups and could be attributed to the close interlayer separation favoring strong π-π interactions between the layers. These interactions along with the additional hydrogen bond stability provided by the keto-enol tautomerized —OH groups account for the high chemical and thermal stabilities of the COF3. The short interlayer separations could be attributed to hydrogen bond interactions around the phloroglucinol cores which enhance the π-π interactions indicating the crystalline nature of IISERP-COF3.

The IISERP-COF3 was further characterized by PXRD, TGA, IR, Adsorption isotherm, HRTEM (FIG. 6A to 6I)

Example 10: Structural Characterization of IISERP-COF3_Ni$_3$N

Figure 8A:
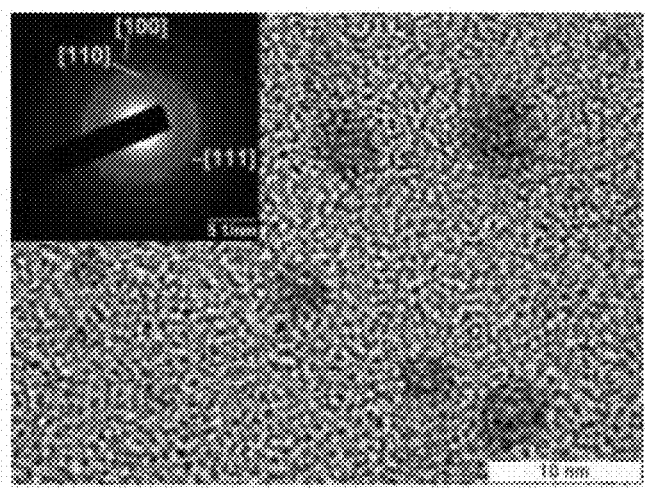
FIG. 8A illustrates the HRTEM image showing the dark regions from the $Ni_3N$ nanoparticles and its lattice fringes having sizes<5 nm.
Figure 8B:
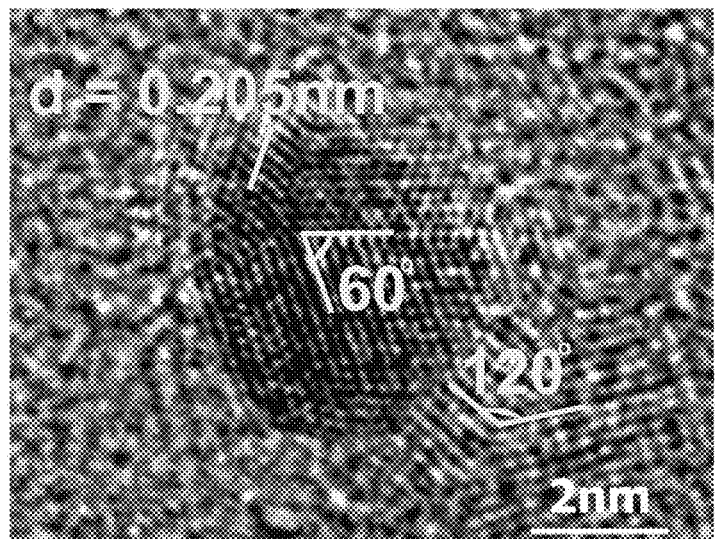
FIG. 8B illustrates the HRTEM image showing the growth of the $Ni_3N$ particles on the COF surface exposing different facets. Lattice fringes with d-spacings and angles corresponding to hexagonal $Ni_3N$ (Sp.gr.: $P6_322$).

XPS spectra (FIG. 7A to 7D) and HRTEM (FIGS. 8A and 8B) images of the $Ni_3N$ loaded phase, IISERP-COF3_$Ni_3N$ suggests uniform distribution of metal nanoparticles within the COF3. The nanocrystallites have sizes in the range of <5 nm. The uniform distribution of the nanoparticles significantly reduces the porosity of the sample. A 72% drop in porosity was observed upon nanoparticle loading.

Example 11: Electrochemical Measurements

The test cell was fabricated in traditional fashion of three-electrode test cell by using Hg/HgO and platinum flag as the reference and counter electrode, respectively. The catalyst coated glassy carbon electrode dried under an IR-lamp was used as the working electrode. The catalyst mass loading was maintained at 20 μg for all the electrochemical studies of IISERP-COF2 composites-A and it was 5 μg for IISERP-COF2_$Ni_3N$ composite B. In all the IISERP-COF2 composites-A, de-aerated 0.1M KOH was used as an electrolyte, while in the case of Composite-B de-aerated 1M KOH was used as an electrolyte.

Linear sweep voltammograms (LSVs) of composites 1-5 were investigated to examine the anodic reaction by scanning in a potential window of 1.1 to 1.7 V (vs. RHE) at 1600 rotation per minute (rpm) of working electrode.

Figure 9A:
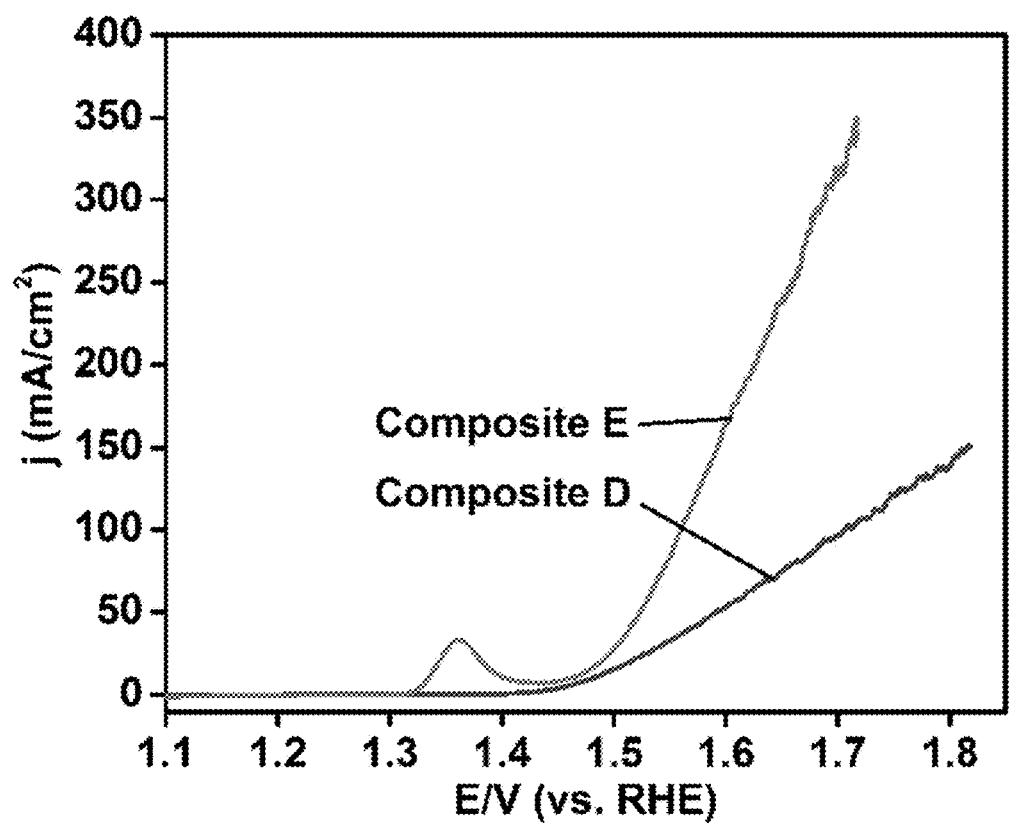
FIG. 9A illustrates the LSV plots for the composites-A and B.
Figure 9B:
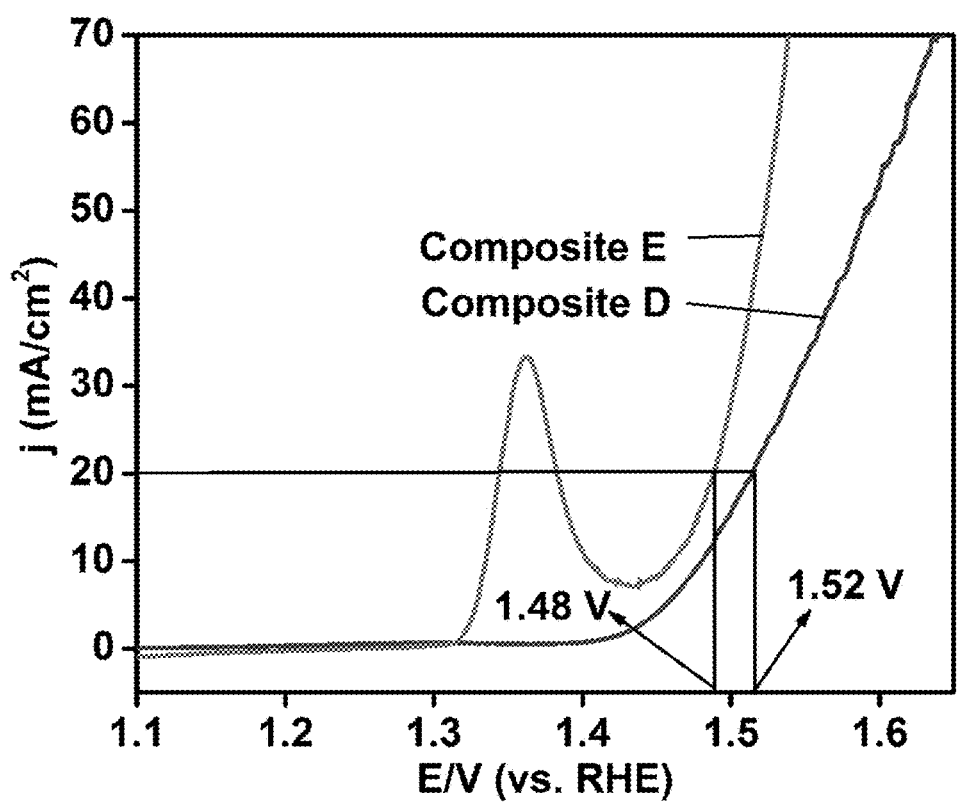
FIG. 9B shows a zoom-in on the LSV plots showing the intercepts corresponding to over potentials of 250 and 310 mV at 20 mA/cm² for composites A and B, respectively.

The peaks at ~1.30 V for Composite-A and at 1.36V for Composite-B, before the onset of oxygen evolution reaction (OER) corresponds to the formation of Ni (III) or Ni (IV) species, that are characteristics of the active nickel site. This was followed by a sharp augment in current due to the oxygen evolution as evident from FIG. 9A. The composites 1-5 show the characteristic property of oxygen evolution at potential>1.40V (vs. RHE) (FIG. 9B). Among the composites A, composite 1A with 4 wt % Co+12 wt % Ni showed the best OER characteristics with lowest onset (1.43V) and overpotential (250 mV@10 mA/cm$^2$). The Composite-B, IISERP-COF3_$Ni_3N$, has an onset potential at 1.43V and an overpotential of 230 mV@10 mA/cm$^2$, which we report as one of the lowest overpotential stated for any water splitting electrocatalyst. Also, composite-B was capable of delivering current densities of 350 mA/cm$^2$ in 1 M KOH.

Figure 9C:
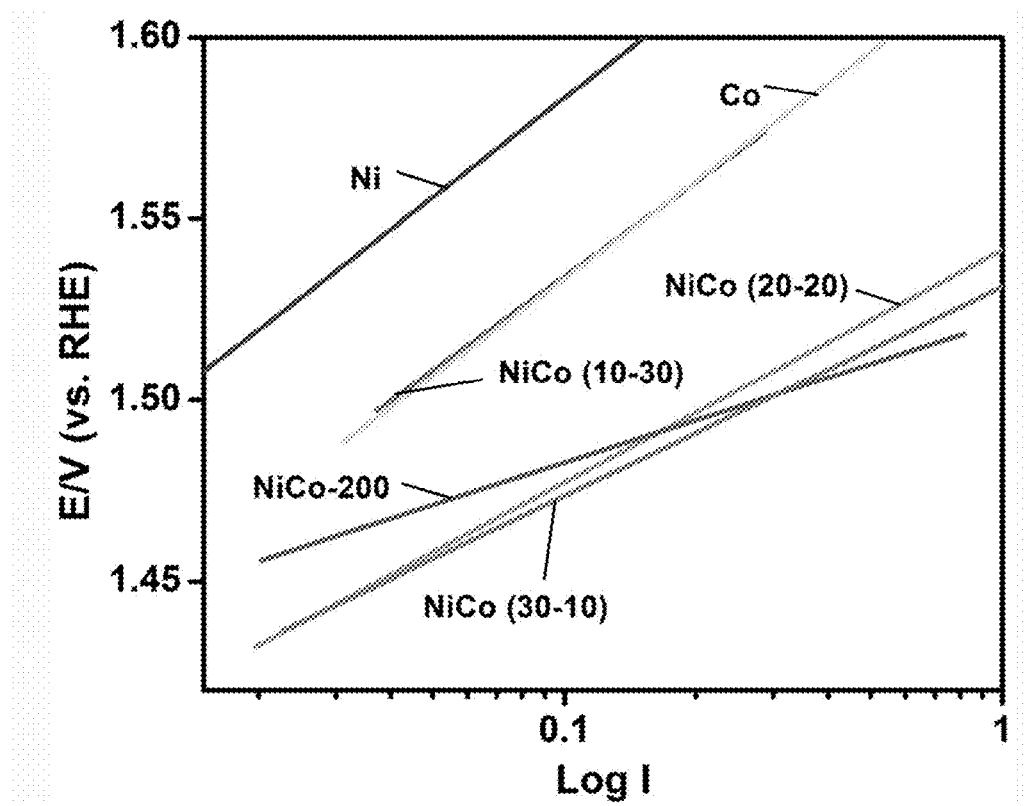
FIG. 9C shows the Tafel plots for the different composites made using IISERP-COF2 and Ni/Co/Ni—Co nanoparticles (75% IR-compensated) showing the most favourable charge transfer kinetics for the composite-A (30:10 wt. % Ni:Co).
Figure 9D:
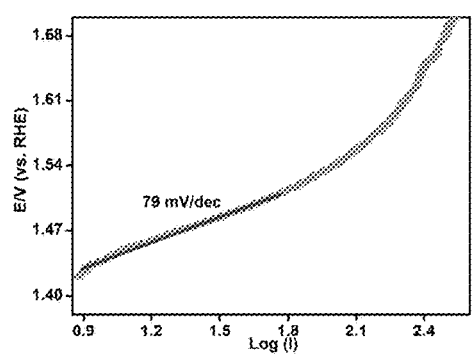
FIG. 9D shows the Tafel plot for the composite-B (75% IR-compensated).

It was further observed that although the gas evolution at the catalyst coated electrode during the electrolysis was very vigorous, gas bubbles dissipated rapidly into the solution with no bubble accumulation observed on the electrode surface. This was evident from the kinetics associated with the mass transfer at the electrode-electrolyte contacts which were examined using a Tafel plot (with 75% IR-compensation). The Tafel slopes (FIGS. 9C and 9D) from a log I vs. potential showed a low value of 38 mV per decade of current for Composite-A and 79 mV/decade for current for Composite-B. Thus, both the composites of the present invention possess good kinetics at the electrode-electrolyte interface which indicates poor rate of corrosion of the catalyst and enhanced stability.

To evaluate the Faradaic efficiency of the composites of the present invention, Rotating Ring Disk Electrode (RRDE) experiment was carried out by applying the series of current density steps from 2 to 10 mAcm$^{-2}$, Faradaic efficiency was calculated to be 0.9 and 0.98@1 mA/cm$^2$ for composite-A and B, respectively. The electrochemical surface area (ECSA) and roughness factor (RF) for composite-A were 4.7 cm$^2$ and 64±4, while these were 1.21 cm$^2$ and 17±2 for composite-B. Composites-A and B had double layer capacitance of 3.98×10$^{-4}$ and 3.63×10$^{-5}$ F/cm$^2$, respectively.

Another factor that quantifies the oxygen evolution is the Turn Over Frequency (TOF), which was estimated for both the composites. TOF was measured to be 0.186170 s$^{-1}$@overpotential of 400 mV for composite A and 0.52 s$^{-1}$@overpotential of 300 mV (assuming that all the metal sites are involved in OER) for composite B, which was six- and twenty-fold higher than that obtained with the benchmarked Ir/C (0.027 s$^{-1}$).

Figure 9E:
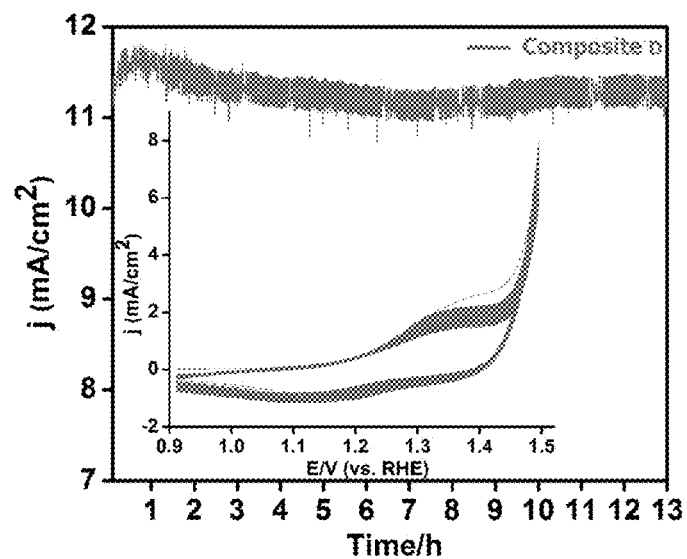
FIGS. 9E and 9F show the Chronoamperometry plots for composites A and B showing the stability in the current outputs over 13/20 hrs. Inset shows the Ni(III)-Ni(IV) redox couple being stable over 500 CV cycles.
Figure 9F:
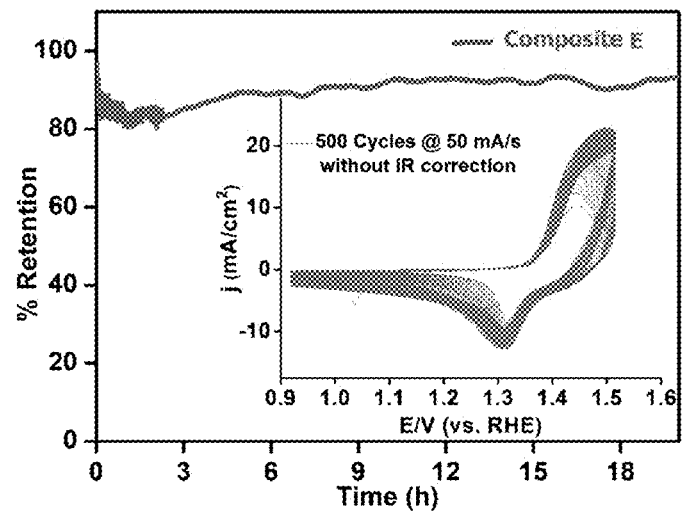

The chronoampeperometry measurements on the composites indicated the stable current that could be generated over several hours (FIGS. 9E and 9F). The cyclic stability was confirmed by potential scanning for 500 cycles in Faradaic region (~0.9 to 1.45 V, Insets of FIGS. 9E and 9F). All the samples displayed good stability with minimal current loss, which indicate the COF backbone was assisting the particles to be more stable in a compacted area. The XPS analysis of the post OER samples showed the presence of Ni and Co in their +2 oxidation states. In order to verify the stability of the catalyst under the operating conditions, metal-loaded COFs were suspended in 0.1M KOH solution for 24 hrs and subjected the dried solid extracted from the supernatant to an EDAX analysis. No metal components were observed in the extract, except for the potassium from the electrolyte, which confirmed the lack of catalyst leaching. The electrochemical stability was further substantiated from the highly reproducible redox activity of the catalyst even after 500 cycles and the onset and overpotential of the sample before and after such cycles remained unchanged. These results confirmed lack of any kind of surface passivation.

The Electrochemical measurements for composite A and composite B are provided in Table 1 below.

As has been described above, the present disclosure makes it possible to provide electro catalysts comprising covalent organic framework (COF) as a porous support for noble metal free nanoparticles in water splitting with low overpotential, with minimal current loss, minimum surface passivity and stability up to 500 cycles. The electrocatalyst of the present invention reduces the activation energy associated with the anodic evolution reaction during electrolysis of water and also improves the charge/mass transfer kinetics.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

TABLE 1

Important electrochemical parameters quantifying the OER efficiency

| Sr. No | Name of the Compound | Name or code | Onset potential (V) | Electrolyte | Overpotential at 10 mA/cm$^2$ (mV) | Tafel Slope (mV/dec) |
|---|---|---|---|---|---|---|
| 1 | IISERP-COF2 | Tris(4-formyl phenyl)amine-terephaldehyde polymer | — | — | — | — |
| 2 | IISERP-COF2_16Ni(OH)$_2$ | 1 | 1.5523 | 0.1M KOH | 480 | 91 |
| 3 | IISERP-COF2_16Co(OH)$_2$ | 2 | 1.5383 | 0.1M KOH | 394 | 89 |
| 4 | IISERP-COF2_8Co(OH)$_2$ + 8Ni(OH)$_2$ | 3 | 1.4683 | 0.1M KOH | 308 | 64 |

TABLE 1-continued

Important electrochemical parameters quantifying the OER efficiency

| Sr. No | Name of the Compound | Name or code | Onset potential (V) | Electrolyte | Overpotential at 10 mA/cm² (mV) | Tafel Slope (mV/dec) |
|---|---|---|---|---|---|---|
| 5 | IISERP-COF2_12Co(OH)$_2$ + 4Ni(OH)$_2$ | 4 | 1.4683 | 0.1M KOH | 392 | 83 |
| 6 | IISERP-COF2_4Co(OH)$_2$ + 12Ni(OH)$_2$ | 5 or Composite-1A | 1.43 | 0.1M KOH | 250 | 38 |
| 7 | IISERP-COF3 | BzImidazole-phloroglucinol polymer | — | — | — | — |
| 8 | IISERP-COF3_8Ni$_3$N | Composite-B | 1.4300 | 1M KOH | 230 | 79 |

What is claimed is:

1. A stable covalent organic framework (COF) supported noble metal free nanoparticle composite of the general formula I as electro catalysts for water splitting with low over potential comprising a compound of Formula I:

COF_A$x$B$y$(M)$n$     (Formula I)

wherein COF is a Tris (4-formylphenyl)amine terephthaldehyde polymer or a benzimidazole-phloroglucinol polymer;

'A' and 'B' each independently represent a transition metal selected from the group consisting of Ni, Co, Fe, Mn, and Zn; and 'M' represents a hydroxide ion or a nitride ion;

wherein, when 'M' represents the hydroxide ion;

'x' and 'y' represent the weight % of the metal loadings in the range 16-18 wt % of total wt % of COF; or x=0 to 16 wt % or 0 to 18 wt % and y=0 to 16 wt % or 0 to 18 wt %; or 'x' and 'y' together represents 16 to 18 wt %;

'n' is an integer of 2 or 3; and

COF represents Tris(4-formylphenyl)amine terephthaldehyde polymer; or wherein, when 'M' represents a nitride ion;

x=0 to 8 wt % and y=0 to 8 wt %; or 'x' and 'y' together represent 8 wt %;

'n' is 1 or 2 or 3; and

COF represents benzimidazole-phloroglucinol polymer.

2. The stable covalent organic framework (COF) supported noble metal free nanoparticle composite as claimed in claim 1, comprising a 'composite A' of the formula;

COF2_A$x$B$y$(OH)$_2$ wherein COF2 represents Tris(4-formylphenyl)amine terephthaldehyde polymer.

3. The stable covalent organic framework (COF) supported noble metal free nanoparticle composite as claimed in claim 2, wherein said composite comprises:

COF2_Co/Ni(OH)$_2$ wherein the Co:Ni ratio is 10 mg:30 mg for total 100 mg of COF2.

4. A stable covalent organic framework (COF) supported noble metal free nanoparticle composite, wherein said composite comprises:

COF2_16Ni(OH)$_2$;     i.

COF2_16Co(OH)$_2$;     ii.

COF2_8Co(OH)$_2$+8Ni(OH)$_2$;     iii.

COF2_12Co(OH)$_2$+4Ni(OH)$_2$; or     iv.

COF2_4Co(OH)$_2$+12Ni(OH)$_2$;     v.

wherein COF2 represents Tris(4-formylphenyl)amine terephthaldehyde polymer.

5. The stable covalent organic framework (COF) supported noble metal free nanoparticle composite as claimed in claim 1, comprising a 'composite B' of the formula;

COF3_A$x$B$y$(M)$_n$ wherein:

'M' represents a nitride ion; and

COF3 represent benzimidazole-phloroglucinol polymer.

6. The stable covalent organic framework (COF) supported noble metal free nanoparticle composite as claimed in claim 5, comprising COF3_Ni$_3$N wherein COF3 comprises benzimidazole-phloroglucinol polymer.

7. The process for synthesis of the stable covalent organic framework (COF) supported noble metal free nanoparticle composite as claimed in claim 2, wherein the transition metal nanoparticle composite has the general formula:

COF2_A$x$B$y$(OH)$_2$;

said process comprising:
i. heating a mixture of Tris(4-formylphenyl)amine and 1,4-diaminobenzene in polar protic or non-polar solvents either alone or in combination thereof and aq. acetic acid under the conditions suitable to form solvated COF2 in α-phase;
ii. desolvating COF2-α to obtain stable COF2 in β phase; and
iii. adding a solution of a hydrated metal salt to a suspension of COF2-β in a solvent followed by reduction of metal ion (M$^{2+}$) in aqueous medium to obtain the desired composite,
wherein said hydrated metal salt is a hydrated salt of A, B, or a mixture thereof.

8. The process for synthesis of the stable covalent organic framework (COF) supported noble metal free nanoparticle composite as claimed in claim 1, wherein the transition metal nanoparticle composite has the general formula COF3_Ni$_3$N, said method comprising:
i. reacting 3,3'-diaminobenzidine and 1,3,5-triformyl phloroglucinol in a mixture of solvents at a temperature ranging from r.t to 130° C. to obtain COF3;
ii. adding a mixture of grounded Nickel acetate tetra hydrate and urea or hexamethylenetetramine to COF3 powder followed by annealing to obtain the composite COF3_Ni$_3$N.

9. A method for oxygen generation during splitting of water with low over potential, comprising contacting the water containing electrolyte with the covalent organic framework (COF) supported noble metal free nanoparticle composite as claimed in claim 1.

10. A method for oxygen generation during splitting of water with low overpotential comprising contacting the water containing electrolyte with the covalent organic framework (COF) supported noble metal free nanoparticle composite as claimed in claim 2.

11. The method as claimed in claim 10, wherein the electrolyte is de-aerated 0.1 M KOH.

12. The method for oxygen generation during splitting of water with low overpotential comprising contacting the water containing electrolyte with the covalent organic framework (COF) supported noble metal free nanoparticle composite as claimed in claim 5.

13. The method as claimed in claim 12, wherein the electrolyte is de-aerated 1 M KOH.

14. A stable covalent organic framework (COF) supported noble metal free nanoparticle composite of the general formula I as electro catalysts for water splitting with low over potential comprising a compound of Formula I:

$$COF\_A_xB_y(M)n \qquad \text{(Formula I)}$$

wherein COF is a Tris (4-formylphenyl)amine terephthaldehyde polymer or a benzimidazole-phloroglucinol polymer;

'A' and 'B' each independently represent a transition metal selected from the group consisting of Ni, Co, Fe, Mn, and Zn;

the ratio x:y is between 0:1 and 1:0;

'M' represents a hydroxide ion or a nitride ion; and

'n' is an integer ranging from 1 to 3.

15. The stable covalent organic framework (COF) supported noble metal free nanoparticle composite as claimed in claim 14, wherein M is a hydroxide ion.

16. The stable covalent organic framework (COF) supported noble metal free nanoparticle composite as claimed in claim 14, wherein M is a nitride ion.

17. The stable covalent organic framework (COF) supported noble metal free nanoparticle composite as claimed in claim 15, wherein COF is a Tris (4-formylphenyl)amine terephthaldehyde polymer.

18. The stable covalent organic framework (COF) supported noble metal free nanoparticle composite as claimed in claim 16, wherein COF is a benzimidazole-phloroglucinol polymer.

19. The stable covalent organic framework (COF) supported noble metal free nanoparticle composite as claimed in claim 14, wherein COF is a Tris (4-formylphenyl)amine terephthaldehyde polymer.

20. The stable covalent organic framework (COF) supported noble metal free nanoparticle composite as claimed in claim 14, wherein COF is a benzimidazole-phloroglucinol polymer.

* * * * *